United States Patent [19]

Hayakawa

[11] Patent Number: 5,258,803
[45] Date of Patent: Nov. 2, 1993

[54] CAMERA DETECTING FOCUS TO PLURAL AREAS AND DECIDING FLASH ELIMANATION BASED ON THE PLURAL AREAS

[75] Inventor: Shingo Hayakawa, Kanagawa, Japan

[73] Assignee: Canon Kabushiki Kaisha, Tokyo, Japan

[21] Appl. No.: 965,575

[22] Filed: Oct. 23, 1992

Related U.S. Application Data

[63] Continuation of Ser. No. 646,248, Jan. 28, 1991, abandoned.

[30] Foreign Application Priority Data

Jan. 30, 1990 [JP] Japan ................... 2-019736
Jan. 30, 1990 [JP] Japan ................... 2-019737

[51] Int. Cl.$^5$ .................... G03B 13/36; G03B 15/05
[52] U.S. Cl. .................... 354/402; 354/414; 354/432
[58] Field of Search ........... 354/402, 406, 407, 408, 354/412, 414, 429, 432

[56] References Cited

U.S. PATENT DOCUMENTS

| | | | |
|---|---|---|---|
| 4,339,185 | 7/1982 | Nakauchi et al. | 354/31 |
| 4,534,636 | 8/1985 | Sugawara | 354/403 |
| 4,690,536 | 9/1987 | Nakai et al. | 354/402 |
| 4,704,024 | 11/1987 | Tsunekawa | 354/432 |
| 4,745,427 | 5/1988 | Izumi et al. | 354/432 |
| 4,746,947 | 5/1988 | Nakai | 354/402 |
| 4,786,935 | 11/1988 | Hayakawa et al. | 354/432 |
| 4,855,780 | 8/1989 | Hayakawa | 354/432 |
| 4,862,206 | 8/1989 | Ootsuka et al. | 354/414 |
| 4,870,443 | 9/1989 | Hayakawa et al. | 354/432 |
| 4,912,495 | 3/1900 | Ishikawa et al. | 354/402 |
| 4,984,006 | 1/1991 | Ikemura et al. | 354/414 |

FOREIGN PATENT DOCUMENTS

| | | |
|---|---|---|
| 3803305 | 8/1988 | Fed. Rep. of Germany . |
| 2539519 | 7/1984 | France . |
| 51-9271 | 1/1976 | Japan . |
| 62-203022 | 9/1987 | Japan . |
| 63-7330 | 2/1988 | Japan . |
| 1-202720 | 8/1989 | Japan . |
| 1-280737 | 11/1989 | Japan . |
| 2-20842 | 1/1990 | Japan . |
| 2077448 | 12/1981 | United Kingdom . |

Primary Examiner—Russell E. Adams
Attorney, Agent, or Firm—Fitzpatrick, Cella, Harper & Scinto

[57] ABSTRACT

A camera comprising a detection circuit for dividing a field of view into plural small areas and detecting luminance for each of the plural small areas, a focus detecting circuit capable of effecting focus detecting for each of plural focus detecting areas in the field of view, a selection circuit for selecting at least one of the plural focus detecting areas to be utilized by the focus detecting circuit, and a decision circuit for determining the necessity of flash illumination by using first luminance information detected by the detection circuit for the small area containing the focus detecting area selected by the selection circuit and second luminance information for the small area having a maximum luminance among the plural small areas. The camera can precisely determine a backlighting condition in particular.

30 Claims, 16 Drawing Sheets

FIG.13(a)

$K \leqq C$

|  | $\Delta CB$ |  |  |
|---|---|---|---|
| (STEP118)<br>(vii)<br>$\alpha = 0$ | (STEP115)<br>(iv)<br>$Q_{H1}$ $\alpha = \alpha_{H2}$ | (STEP112)<br>(i)<br>$\alpha = \alpha_{H1}$ |
| (STEP119)<br>$P_{H2}$<br>(viii)<br>$\alpha = 0$ | (STEP116)<br>0<br>(v)<br>$\alpha = 0$ | (STEP113) → $\Delta BA$<br>$P_{H1}$<br>(ii)<br>$\alpha = \alpha_{H1}$ |
| $\alpha = \alpha_{H2}$<br>(ix)<br>(STEP120) | $Q_{H2}$ $\alpha = \alpha_{H2}$<br>(vi)<br>(STEP117) | $\alpha = \alpha_{H2}$<br>(iii)<br>(STEP114) |

|  | $\Delta CB$ |  |  |
|---|---|---|---|
| (STEP135)<br>(vii)<br>$\alpha = 0$ | (STEP132)<br>(iv)<br>$Q_{L1}$ $\alpha = 0$ | (STEP129)<br>(i)<br>$\alpha = \alpha_{L1}$ |
| (STEP136)<br>$P_{L2}$<br>(viii)<br>$\alpha = \alpha_{L2}$ | (STEP133)<br>0<br>(v)<br>$\alpha = 0$ | (STEP130) → $\Delta BA$<br>$P_{L1}$<br>(ii)<br>$\alpha = \alpha_{L1}$ |
| $\alpha = \alpha_{L2}$<br>(ix)<br>(STEP137) | $Q_{L2}$ $\alpha = \alpha_{L2}$<br>(vi)<br>(STEP134) | $\alpha = 0$<br>(iii)<br>(STEP131) |

FIG.14(a)(Vii) 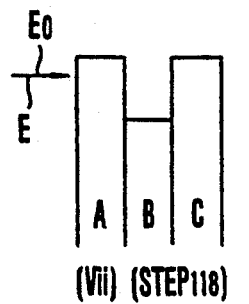
(Vii) (STEP118)
FIG.14(a)(iv) 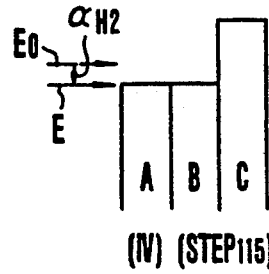
(iv) (STEP115)

(i) (STEP112)
FIG.14(a)(Viii) 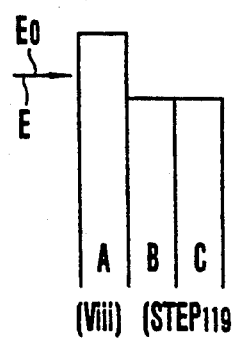
(Viii) (STEP119)

(V) (STEP116)
FIG.14(a)(ii) 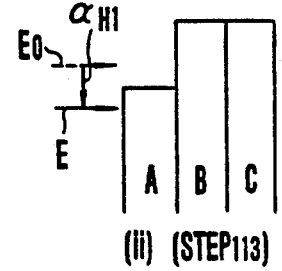
(ii) (STEP113)
FIG.14(a)(ix) 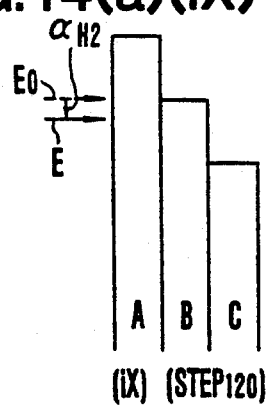
(ix) (STEP120)
FIG.14(a)(Vi) 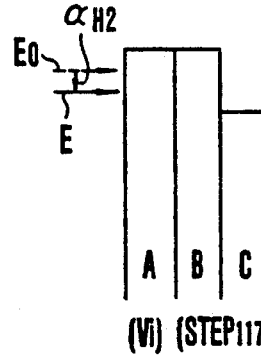
(Vi) (STEP117)
FIG.14(a)(iii) 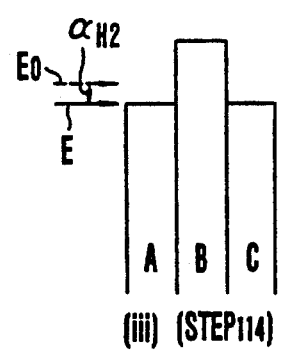
(iii) (STEP114)

FIG.14(b)(Vii)
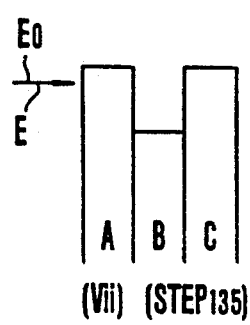
(Vii) (STEP135)
FIG.14(b)(iv)
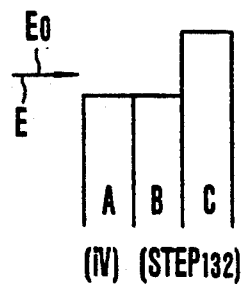
(iv) (STEP132)
FIG.14(b)(i)
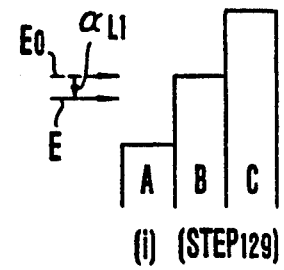
(i) (STEP129)
FIG.14(b)(Viii)
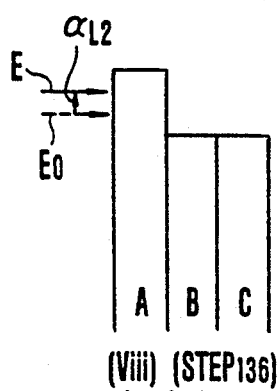
(Viii) (STEP136)
FIG.14(b)(V)
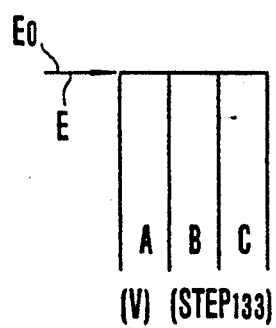
(V) (STEP133)
FIG.14(b)(ii)
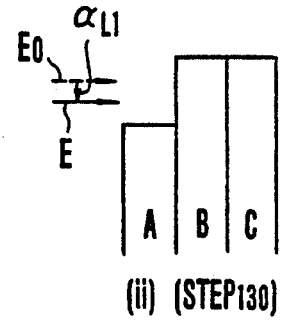
(ii) (STEP130)
FIG.14(b)(iX)
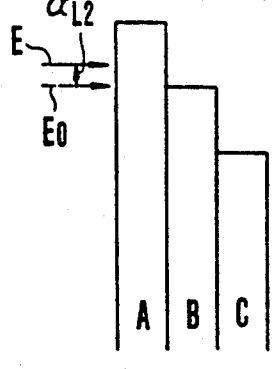
(iX) (STEP137)
FIG.14(b)(Vi)
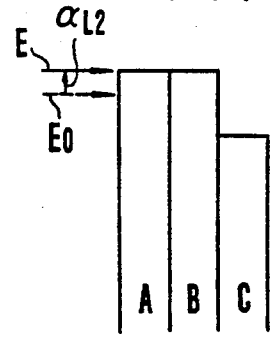
(Vi) (STEP134)
FIG.14(b)(iii)
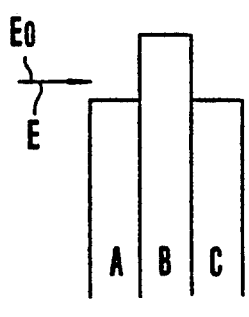
(iii) (STEP131)

FIG.15(a)

| 0.1 | 0.25 | 0.1 | 0.1 | 0.1 |
|---|---|---|---|---|
| 0.25 | 1 | 0.25 | 0.1 | 0.1 |
| 0.1 | 0.25 | 0.1 | 0.1 | 0.1 |

FIG.15(b)

| 0.1 | 0.1 | 0.25 | 0.1 | 0.1 |
|---|---|---|---|---|
| 0.1 | 0.25 | 1 | 0.25 | 0.1 |
| 0.1 | 0.1 | 0.25 | 0.1 | 0.1 |

FIG.15(c)

| 0.1 | 0.1 | 0.1 | 0.25 | 0.1 |
|---|---|---|---|---|
| 0.1 | 0.1 | 0.25 | 1 | 0.25 |
| 0.1 | 0.1 | 0.1 | 0.25 | 0.1 |

CAMERA DETECTING FOCUS TO PLURAL AREAS AND DECIDING FLASH ELIMANATION BASED ON THE PLURAL AREAS

This application is a continuation of application Ser. No. 07/646,248 filed Jan. 28, 1991, now abandoned.

BACKGROUND OF THE INVENTION

1. Field of the Invention

This invention relates to a camera for making light measurement by dividing a field of view into plural areas.

2. Description of the Related Art

There have heretofore been proposed various light measuring devices of the type wherein a field of view is divided into plural areas, a luminance value signal is outputted for each area, and the outputted plural luminance value signals are employed to give the photographed image plane correct exposure.

For example, Japanese Utility Model Publication No. Sho 51-9271 proposes a light measuring device in which outputs from plural photoelectric transducers are processed to calculate an arithmetical mean value of maximum and minimum ones thereamong which is used as a light measurement value.

Also, Japanese Patent Publication No. Sho 63-7330 proposes a light measuring device in which a field of view is divided into plural areas, light measurement is effected for a central area and other plural outer areas arranged to surround the central area, the luminance of each area is standardized by using a reference value set between maximum and minimum values of the luminance for those areas, and the field of view is grouped on the basis of the standardized output to calculate a light measurement value by using an output corresponding to the determined group.

In the foregoing prior-art light measuring devices, arrangement of a main object in the photographed image plane has not been properly taken into account. In anticipation of mounting the light measuring device on the camera having an automatic focus detecting device or the like, however, it has also been proposed to take due consideration of the arrangement of a main object in the photographed image plane.

U.S. Pat. No. 4,912,495 proposes a light measuring device in which a main object is assumed to be positioned in a central portion of the image plane, and a field of view is divided into multiple areas comprising at least a plurality of concentric areas about the central portion of the image plane. By assuming the size of the main object based on information of photographing magnification, luminance value signals for the concentric areas are selectively employed so that luminance of the main object may be obtained precisely. This U.S. Patent also proposes to calculate luminance of the background in addition to the luminance of the main object, to thereby change the formula used to calculate a light measurement value by utilizing the luminance difference between the background and the main object. This enables the light measuring device not only to provide correct exposure for the main object, but also to provide correct exposure in match with the photographing situations when the main object is small.

Further, U.S. Pat. No. 4,786,935 proposes a light measuring device in which a main object is assumed to be conveniently located in a central portion of the image plane, and a field of view is divided into at least three areas; i.e., an area at the central portion of the image plane, an intermediate area, and an outermost area. Based on luminance value signals from those plural areas and the differences between the luminance value signals from every two areas adjacent to each other, the approximate size of the main object and the photographing situations are determined simultaneously. This U.S. patent is advantageous in that because the approximate size of the main object is determined by utilizing the difference between the luminance value signals, the light measurement is less dependent on the actual size of the main object than the case of presuming the size of the main object by using the photographing magnification, and correct exposure can be obtained stably.

In the above-cited two prior-art light measuring devices, the main object is assumed to be conveniently located in a central portion of the image plane for the reason that cameras equipped with automatic focus detecting devices have their focus detecting areas generally set in the central portion of the image plane. Meanwhile, there has been recently proposed an automatic focus detecting device which has a plurality of focus detecting areas. In a camera equipped with such an automatic focus detecting device, a main object can be conveniently located in any of the plural focus detecting areas, including any particular one of the areas other than the central portion of the image plane.

In view of the above, Japanese Laid-Open Patent Application No. Hei 1-202720 proposes a light measuring device suitable for such a camera having plural focus detecting areas. As an applied improvement of Japanese Laid-Open Patent Application No. Sho 62-203022 which determines luminance of a main object based on information of photographing magnification, the above patent application discloses a calculation to modify weights for one light measuring area and another light measuring area based on information of one selected focus detecting area and information of the focused condition of the other focus detecting area when the selected area is in an in-focus state, as well as information of photographing magnification and information of the focal length of a photographing lens. The luminance of the main object is thereby measured precisely and outputted as a light measurement value for photographing under natural light.

While a variety of light measuring devices have been proposed which divide a field of view into plural areas and calculate a light measurement value through various arithmetic operations, as explained above, such devices for precisely determining whether flash illumination should be triggered or not have been proposed in a relatively small number. As a device for detecting only a backlighting condition, for example, Japanese Laid-Open Patent Application No. Hei 1-280737 proposes a device for detecting a backlighting condition based on the luminance difference between predetermined areas.

Because of the arrangement of dividing a field of view into plural areas and detecting only a backlighting condition based on luminance difference between the predetermined area, the prior-art device of Japanese Laid-Open Patent Application No. Hei 1-280737 is not suitable for cameras which can change focus detecting points, and has suffered from the problem that a backlighting condition of a main object cannot be precisely detected by using only the luminance difference between predetermined areas. As the device of the above Patent Application cannot detect an object of low luminance at the same time, it is of course desirable to have additional means for detecting an object of the low luminance in determining conditions whether or not to trigger the flash illumination. Another problem is that since a backlighting condition is detected using only the luminance difference, situations of a field of view are not so sufficiently recognized as to permit precise detection of a backlighting condition.

SUMMARY OF THE INVENTION

One aspect of this invention is to provide a camera which comprises focus detecting means capable of focus detection to a plurality of focus detecting areas in a photographed image plane independently of one another, and light measuring means for performing light measurement for a plurality of divided light measuring areas, wherein luminance of a light measuring area containing a selected focus detecting area is compared with maximum luminance among other light measuring areas, and whether or not to trigger flash illumination is decided based on information of the compared result, thereby correctly determining a backlighting condition.

BRIEF DESCRIPTION OF THE DRAWINGS

FIGS. 12, 13(a) and 13(b), 14(a) and 14(b), and 15(a), 15(b) and 15(c) are diagrams for explaining the flowcharts according to the first embodiment of this invention.

DETAILED DESCRIPTION OF THE PREFERRED EMBODIMENTS

FIGS. 1 to 15(a), 15(b) and 15(c) are concerned with a first invention of this embodiment, and illustrate a camera having three focus detecting points.

Figure 1:
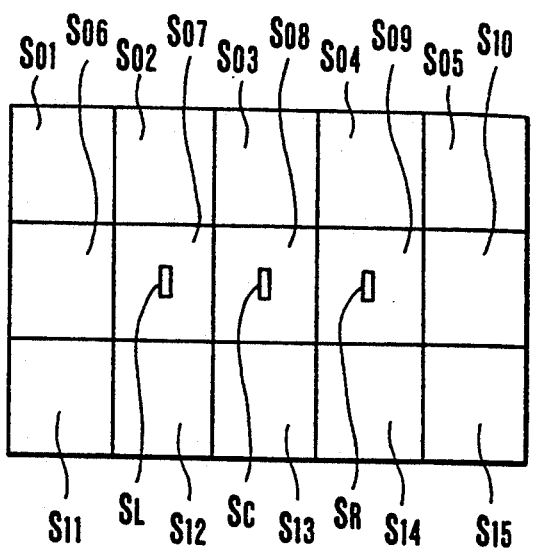
FIG. 1 is an illustration showing a divided pattern of a light receptor for light measurement according to a first embodiment of this invention.

FIG. 1 is an illustration showing a divided pattern of the light receiving plane of a light receptor for light measurement according to the first embodiment of this invention. The divided pattern is shown as projected onto a field of view. In FIG. 1, $S_{01}, S_{02}, \ldots, S_{15}$ represent a plurality of divided light receiving small areas, and $S_L$, $S_C$, $S_R$ represent focus detecting fields shown as projected onto the field of view similarly to the light receptor for light measurement. In this embodiment, as seen from FIG. 1, the field of view is divided into fifteen small areas in total; i.e., three small areas each including one focus detecting point, and twelve small areas surrounding the above three areas. Luminance of the field of view is measured for each of the fifteen small areas.

Figure 2:
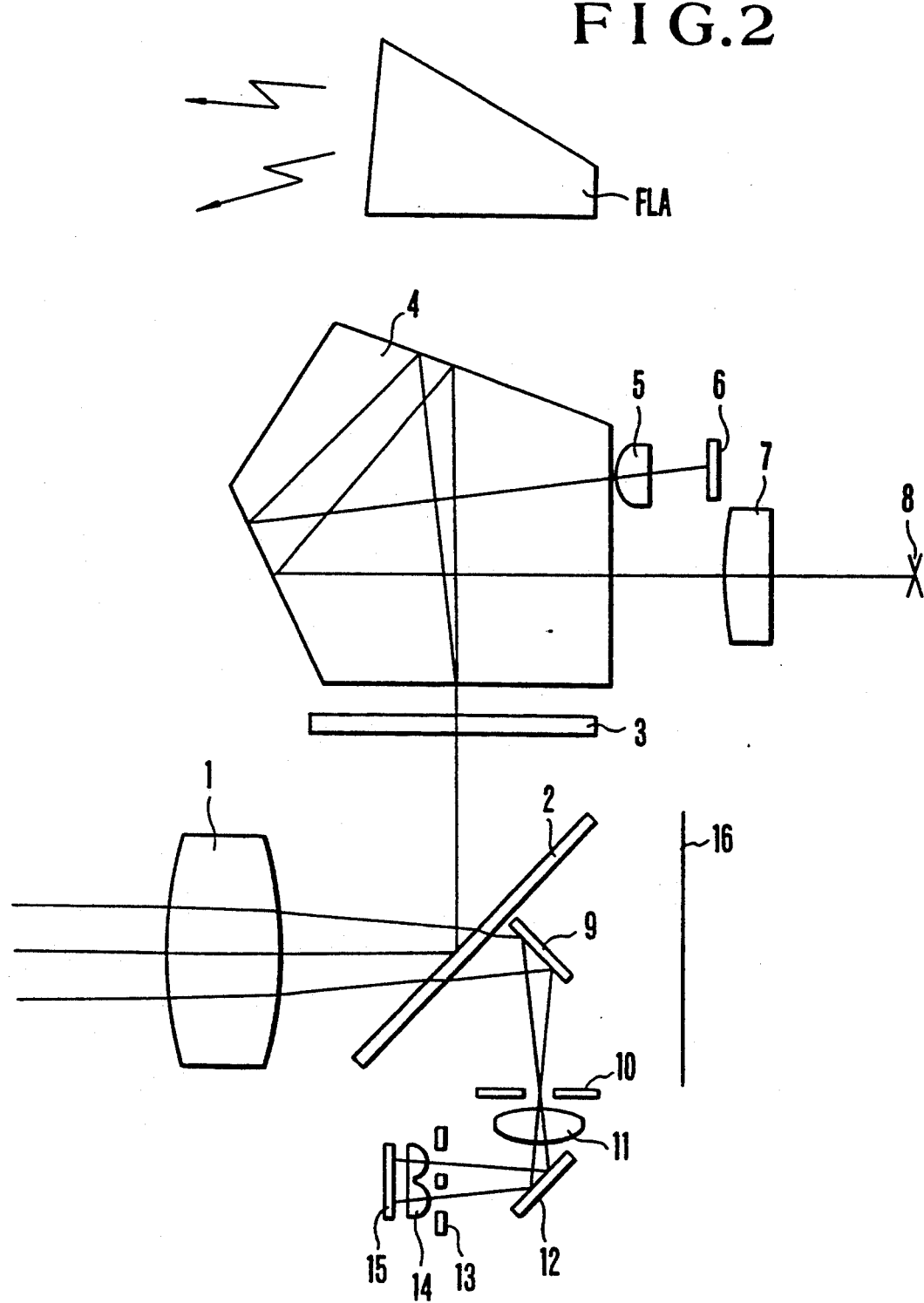
FIG. 2 is a sectional view of an optical system of a camera according to the first embodiment of this invention.

FIG. 2 is a view showing an optical arrangement of a camera according to the first embodiment of this invention. In FIG. 2, denoted by 1 is a photographing lens, 2 a quick-return mirror, 3 a focusing screen, 4 a pentagonal roof prism, 5 an image forming lens for light measurement, 6 a light receptor for light measurement, 7 an eyepiece lens, 8 a pupil position, 9 a sub-mirror, 10 a field mask, 11 a condenser lens, 12 a total-reflecting mirror, 13 a pupil dividing mask, 14 an image forming lens for focus detection, 15 a light receptor for focus detection, and 16 a film plane. In this embodiment, an object image formed by the photographing lens 1 on the focusing screen 3 is in turn formed by the light-measurement image forming lens 5 on the light-measurement light receptor 6 such that the object image is divided into the fifteen small areas shown in FIG. 1 for the light measurement. In parallel, a part of the object image formed in the vicinity of the field mask 10, which is disposed near the expected image plane of the photographing lens 1, is also formed by the focus-detection image forming lens 14 on the focus-detection light receptor 15 to perform the focus detection for those areas corresponding to the three focus detecting fields shown in FIG. 1. FLA denotes a built-in flash unit.

Figure 3:
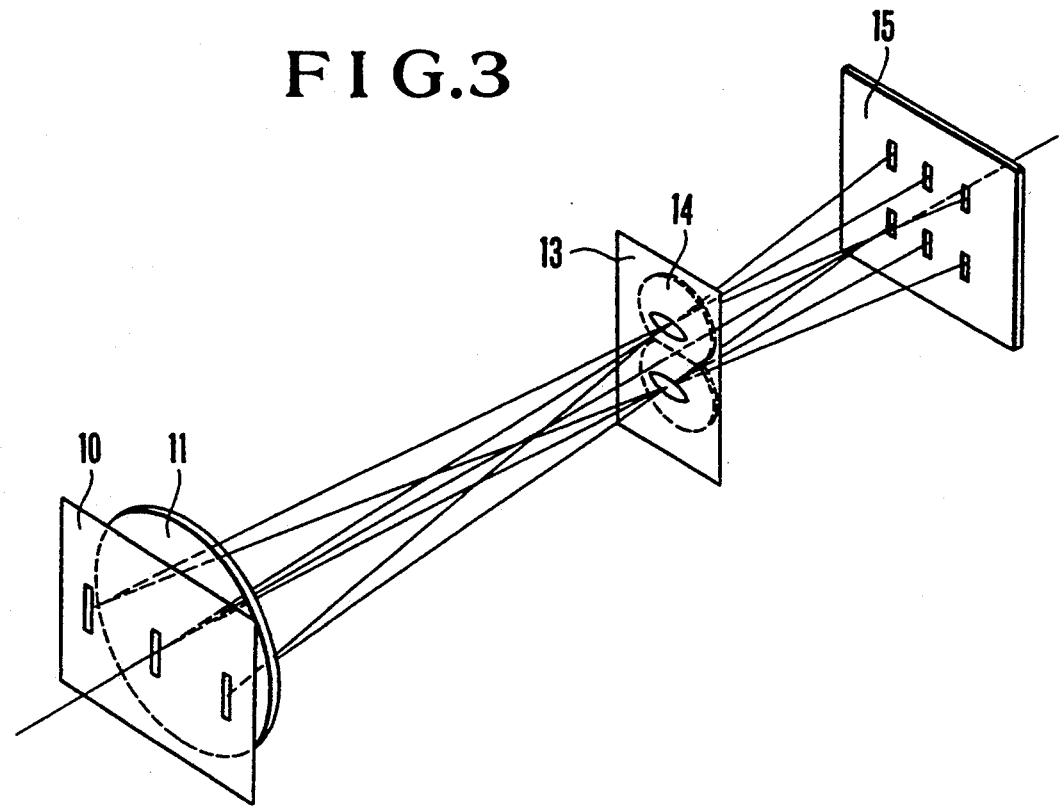
FIG. 3 is a perspective view of a multi-point focus detecting optical system according to the first embodiment of this invention.

FIG. 3 is a perspective view of a focus detecting optical system of FIG. 2 in the developed form. As seen from FIG. 3, the field mask 10 disposed near the expected image plane of the photographing lens 1 has formed therein three openings. The object image formed in the vicinity of those three openings is divided by the focus-detection image forming lens 14 into two images and, simultaneously, formed on the focus-detection light receptor 15 for the focus detection of three points in the photographed image plane.

Figure 4:
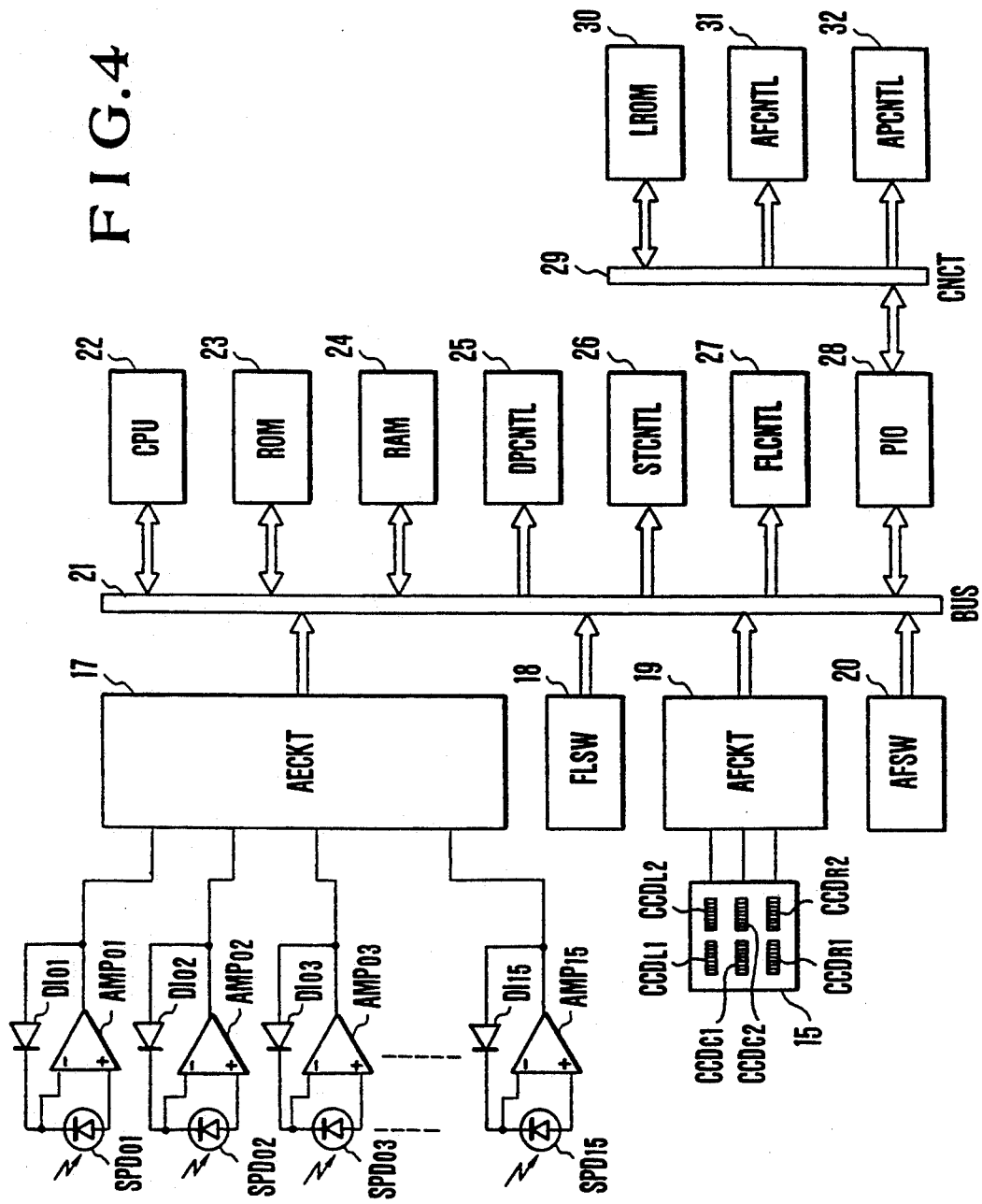
FIG. 4 is a block diagram showing a circuit configuration of the camera according to the first embodiment of this invention.

FIG. 4 is a block diagram showing a circuit configuration of the camera according to the first embodiment of this invention. In FIG. 4, $SPD_{01}, SPD_{02}, \ldots, SPD_{15}$ denote silicon photodiodes (SPD) respectively corresponding to the fifteen light receiving small areas $S_{01}, S_{02}, \ldots, S_{15}$ shown in FIG. 1, and generate photocurrents dependent on luminances of the respective small areas. $AMP_{01}, AMP_{02}, \ldots, AMP_{15}$ and $DI_{01}, DI_{02}, \ldots, DI_{15}$ denote operational amplifiers and compression diodes, respectively. One combined set of the silicon photodiode (SPD), the operational amplifier and the compression diode constitutes light receiving means corresponding to each of the fifteen light receiving small areas shown in FIG. 1. In FIG. 4, denoted by 17 is a light measuring circuit (AECKT) for effecting A/D conversion of output signals depending on the luminances of the plural light receiving small areas and outputting resultant digital signals. 18 is a flash mode selector switch (FLSW) capable of selecting any one of a forced flash mode in which a flash (I.E., built-in flash unit FLA) is forcibly turned on with an intention of the operator (photographer), an automatic detection mode in which automatic illumination of the flash is carried out or advice to use of the flash is indicated, and a forced non-flash mode in which the flash is forcibly turned off with an intention of the operator. 15 is a focus-detection light receptor corresponding to that shown in FIG. 3. $CCD_{L1}$ and $CCD_{L2}$, $CCD_{C1}$ and $CCD_{C2}$ and $CCD_{R1}$ and $CCD_{R2}$ are three pairs of light receiving element arrays corresponding to the focus detecting fields $S_L$, $S_C$, $S_R$ in FIG. 1, respectively. Of the light from a field of view formed on a predetermined area of the photographed image plane, only those light beams which have passed through two different areas on the exit pupil plane of the photographing lens 1 are taken out and focused by the optical system shown in FIGS. 2 and 3 on each pair of the light receiving element arrays. By comparing two output signals from the pair of light receiving element arrays with each other, a defocus amount can be detected. 19 is a focus detecting circuit (AFCKT) for detecting respective defocus amounts of the field of view corresponding to the three focus detecting fields $S_L$, $S_C$, $S_R$ in FIG. 1 based on the output signals from the three pairs of light receiving element arrays provided in the focus-detection light receptor 15, as mentioned above, and outputting information of the three defocus amounts in the form of digital signals. 20 is a focus detecting point selector switch (AFSW) capable of selecting either one of an automatic selection mode in which the camera automatically decides the in-focus position fit for the photographed image plane in accordance with distribution of the defocus amounts of the field of view corresponding to the three focus detecting fields $S_L$, $S_C$, $S_R$ in FIG. 1 with an intention of the operator, and an optional selection mode in which the operator selectively decides any one of the three focus detecting fields in FIG. 1. Furthermore, in the optional selection mode, the operator can designate a focus detecting point to be selected by the focus detecting point selector switch 20. In FIG. 4, input signals from the light measuring circuit (AECKT) 17, the flash mode selector switch (FLSW) 18, the focus detecting circuit (AFCKT) 19, and the focus detecting point selector switch (AFSW) 20 are connected to a data bus line (BUS) 21 inside a microcomputer for use in various types of control.

Continuing with FIG. 4, denoted by 22 is a central processing unit (CPU) for processing the abovementioned various input signals to initiate respective operations of various control mechanisms by using programs stored in various memories, 23 is an read-only memory (ROM) for storing the various programs, 24 is a random access memory (RAM) serving as a working area used for arithmetic operations, 25 is a display control mechanism (DPCNTL), 26 is a shutter speed control mechanism (STCNTL), 27 is a flash control mechanism (FLCNTL), and 28 is a universal input/output port (PIO). These components are all connected to the data bus line (BUS) 21 inside the microcomputer. The CPU 22 executes arithmetic operations in accordance with the programs stored in the ROM 23 by utilizing the above input signals and accessing to the RAM 24. Based on the result of the arithmetic operations, the CPU 22 causes the DPCNTL 25, the STCNTL 26 and the FLCNTL 27 to control indication (display), shutter speed and flash illumination, respectively, and outputs to the PIO 28 a signal for controlling the lens.

Referring continually to FIG. 4, denoted by 29 is a connector (CNCT) for communication between the camera and the lens therethrough. 30 is a read-only memory (LROM) for storing information specific to the photographing lens, 31 is a focus position control mechanism (AFCNTL) for the photographing lens, and 32 is an aperture control mechanism (APCNTL) for the photographing lens. The LROM 30, the AFCNTL 31 and the APCNTL 32 all incorporated in the photographing lens are connected to the PIO 28 in the camera through the CNCT 29, so that data is read out of the memory or the control mechanisms are operated in accordance with an instruction from the CPU 22 in the camera.

With this embodiment, as explained above, the microcomputer is operated to control the display device, the shutter, the flash, focus position adjustment of the photographing lens, and the aperture of the camera based on the input signals from the light measuring circuit (AECKT) 17, the flash mode selector switch (FLSW) 18, the focus detecting circuit (AFCKT) 19, and the focus detecting point selector switch (AFSW) 20.

The software configuration of the camera according to the first embodiment of this invention will be described below.

Figure 5:
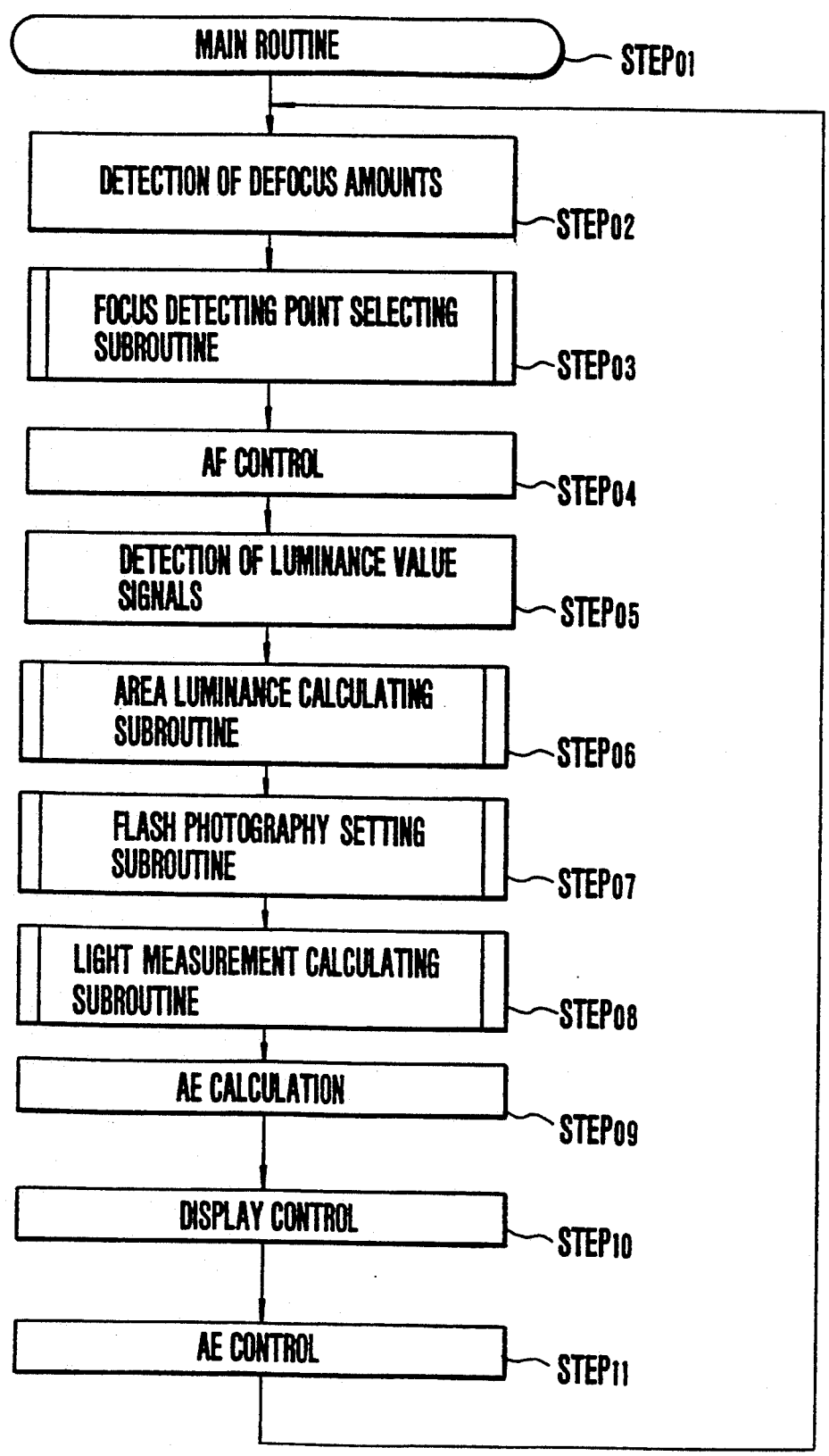
FIGS. 5 to 11 are flowcharts for operation of the camera according to the first embodiment of this invention.

FIGS. 5 to 11 are flowcharts showing the software configuration according to the first embodiment of this invention, in which FIG. 5 depicts a main routine and FIGS. 6 to 11 depict respective subroutines.

First, the main routine of FIG. 5 will be explained.

STEP 01: Main Routine

The main routine handles information regarding the luminance of the field of view, information of respective defocus amounts of a plurality of present focus detecting points, information of flash mode selection based on an intention of the photographer, control of the focus position adjustment using the information of focus detecting point selection, exposure control by setting the shutter speed and the aperture, control of the flash, and control of the indication. There are still other items such as drive control of the quick-return mirror, control of a film feeding mechanism and so forth, which should be also handled by the main routine. However, only those items which are concerned with the light measuring device and the flash photography control device in the camera of this invention are taken into account herein, and other items are omitted for the sake of brevity.

STEP 02: Signals of defocus amounts for the three focus detecting points are taken in from the AFCKT 19. The defocus amounts are calculated by detecting offsets between the output signals from every pair of line sensors; i.e., $CCD_{L1}$ and $CCD_{L2}$, $CCD_{C1}$ and $CCD_{C2}$ and $CCD_{R1}$ and $CCD_{R2}$, corresponding to the focus detecting points in pairs, and are taken in as digital signals.

STEP 03: This is a focus detecting point selecting subroutine in which the focus detecting point selection signal from the AFSW 20 and the defocus amount signals from the AFCKT 19 are taken in. When the photographer selects any one of the three focus detecting points, the signal corresponding to the selected focus detecting point is outputted. When the photographer sets the automatic selection mode in which the camera automatically selects the focus detecting point, the focus detecting point having the nearest object distance is detected from the three defocus amount signals, and the signal corresponding to the thus-detected focus detecting point is outputted. In this way, this subroutine outputs a focus detecting point signal SEL.

STEP 04: From the defocus amount signals of the three focus detecting points and the above focus detecting point signal SEL, the defocus amount to be used for focus adjustment is determined and the focus adjustment of the photographing lens is then carried out by the AFCNTL 30.

STEP 05: Signals corresponding to luminances of the fifteen small areas are taken in from the AECKT 17 in the form of digital signals.

STEP 06: This is a subroutine in which the signals taken in from the AECKT 17 are compensated appropriately based on the information specific to the photographing lens, which is taken in from the LROM 29, for outputting luminance value signals for the field of view corresponding to the respective small areas. Then, based on the above focus detecting point signal SEL, a luminance value signal A for a medium area containing the selected focus detecting point, a luminance value signal B for a medium area on the outer side of the above medium area, and a luminance value signal C for a medium area on the outermost side are calculated by using those plural luminance value signals. A maximum value MAX among the luminance value signals for the fifteen small areas is also calculated. Thus, this subroutine outputs the four luminance value signals A, B, C and MAX.

STEP 07: This is a flash photography setting subroutine in which the input signal from the FLSW 18 is taken in to determine whether or not flash photographing should be effected with an intention of the photographer or based on situations of the field of view judged by the camera, and a signal FLSH indicating whether or not the flash photographing is to be effected is then outputted. The method of judging situations of the field of view by the camera will be described later.

STEP 08: This is a light measurement value calculating subroutine in which the luminance value signals A, B, C and the output signal FLSH of the flash photography setting subroutine are inputted, and a light measurement value E for natural light photographing or flash photographing is then outputted.

STEP 09: Based on the programs preset in the camera, the shutter speed and the aperture value are determined from the light measurement value E. The photographing mode may be switched over among a shutter priority mode, an aperture priority mode, as well as a programmed mode with an intention of the photographer. In either mode, the shutter speed and the aperture value are determined in this step based on the corresponding programs.

STEP 10: Exposure information of the shutter speed and the aperture value, and if necessary, information of the focus detecting point selection, information of the light measuring mode, information of the advice to use the flash, etc. are indicated by the DPCNT 25 on the display device of the camera.

STEP 11: Based on the shutter speed and the aperture value thus determined, the STCNTL 26 controls the shutter speed, APCNTL 32 controls the aperture of the photographing lens, and the FLCNTL 27 controls the flash unit FLA.

Through the foregoing STEP 02 to STEP 11, a series of photographing operations in the camera are completed. Then, the CPU is returned to the STEP 02 to be ready for a next series of photographing operations.

The subroutines will now be explained one by one.

Figure 6:
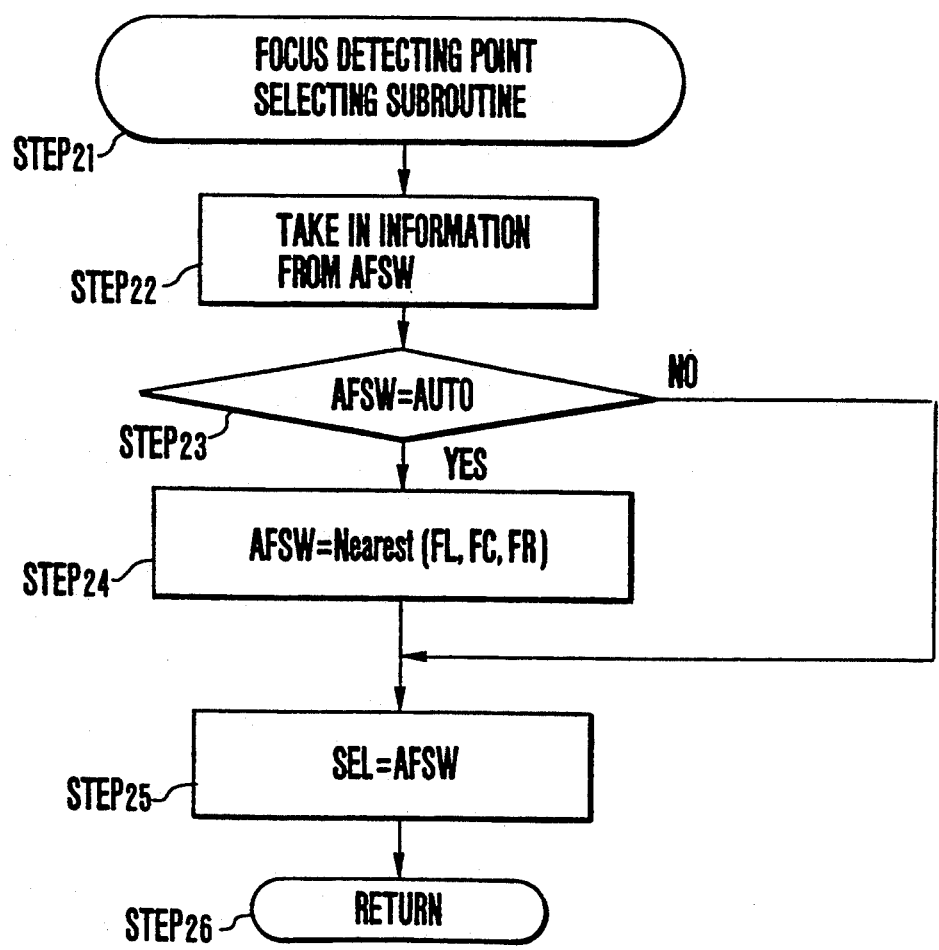

FIG. 6 is a flowchart depicting the focus detecting point selecting subroutine in the STEP 03 of FIG. 5.

STEP 21: Focus detecting point selecting subroutine.

STEP 22: Information of the focus detecting point selection is taken in from the AFSW 20. When the photographer sets the automatic selection mode in which the camera automatically selects the focus detecting point, the AFSW 20 outputs a focus detecting point selection signal AUTO. When the photographer selectively sets one focus detecting point, it outputs a focus detecting point selection signal FL if the focus detecting point $S_L$ positioned on the left-hand side of the photographed image plane is selected, a focus detecting point selection signal FC if the focus detecting point $S_C$ positioned at the center of the photographed image plane is selected, and a focus detecting point selection signal FR if the focus detecting point $S_R$ positioned on the right-hand side of the photographed image plane is selected.

STEP 23: This step determines whether or not the focus detecting point selection signal is AUTO. The CPU proceeds to a STEP 24 in the case of AUTO, and to a STEP 25 in the case of not AUTO.

STEP 24: If the focus detecting point selection signal is AUTO, this step discriminates one of the three focus detecting points $S_L$, $S_C$, $S_R$ to which the object distance is nearest, using the signals indicative of the defocus amounts and the defocusing directions outputted from the AFCKT 19. A signal Nearest (FL, FC, FR) corresponding to the discriminated focus detecting point is outputted.

STEP 25: This step determines the focus detecting point signal SEL depending on the focus detecting point which has been determined by selection of the photographer or automatic selection of the camera. The focus detecting point signal SEL is outputted as any one of FL, FC and FR.

STEP 26: Return to the main routine.

Figure 7:
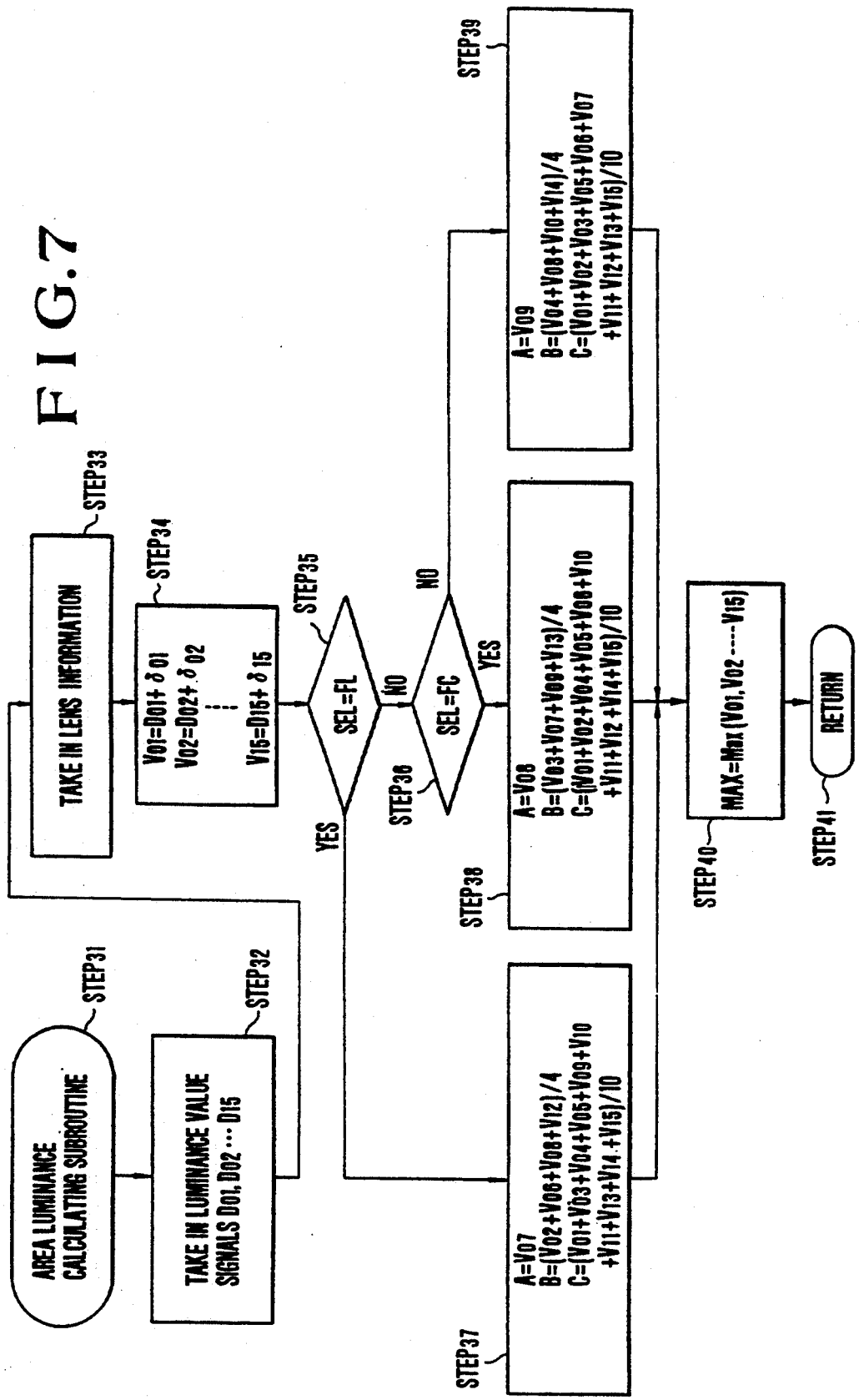

FIG. 7 is a flowchart depicting the area luminance calculating subroutine of the STEP 06 in FIG. 5.

STEP 31: Area luminance calculating subroutine.

STEP 32: This step takes in the digital signals $DI_{01}$, $DI_{02}, \ldots, DI_{15}$ outputted from the AECKT 17 and corresponding to luminances of the fifteen small areas.

STEP 33: This step takes in information specific to the mounted photographing lens from the LROM 33. The information specific to the photographing lens includes information such as the F number in a full aperture state, focal length, exit pupil position, and drop of the peripheral light intensity in a full aperture state.

STEP 34: Using the information specific to the photographing lens, compensation data $\delta_{01}, \delta_{02}, \ldots, \delta_{15}$ respectively to modify the fifteen output signals from the AECLT 17 are determined to calculate the luminance value signals for the respective small areas. In other words, the luminance value signals $V_{01}, V_{02}, \ldots, V_{15}$ are determined from the following equations and then outputted:

$$V_{01} = D_{01} + \delta_{01}$$
$$V_{02} = D_{02} + \delta_{02}$$
$$\vdots$$
$$V_{15} = D_{15} + \delta_{15}$$

It is assumed that the compensation data $\delta_{01}, \delta_{02}, \ldots, \delta_{15}$ are selected and decided from the table previously stored in the ROM 23 based on the above information specific to the photographing lens. Alternatively, the compensation data may be derived through calculations.

STEP 35: This step determines whether or not focus detecting point signal SEL is the signal FL indicating the focus detecting point positioned on the left-hand side of the photographed image plane. If SEL=FL holds, the CPU proceeds to a STEP 37. If SEL≠FL holds, it proceeds to a STEP 36.

STEP 36: This step determines whether or not the focus detecting point signal SEL is the signal FC indicating the focus detecting point positioned at the center of the photographed image plane. If SEL=FC holds, the CPU proceeds to a STEP 38. If SEL=FC holds, it proceeds to a STEP 39.

The STEP 35 and STEP 36 serve to effect a grouping depending on the focus detecting point. Thus, if the focus detecting point is on the left-hand side, the CPU proceeds to the STEP 37. If the focus detecting point is at the center, it proceeds to the STEP 38. If otherwise, i.e., if the focus detecting point is on the right-hand side, it proceeds to the STEP 39.

In the STEPS 37 to 39, the fifteen divided small areas are grouped into three medium areas; i.e., an area near the focus detecting point, an area on the outer side adjacent to that area, and an area on the outermost side. Average luminance is calculated for each medium area and then outputted. On this occasion, the fifteen small areas are grouped such that each of the small areas always belongs to any one of the three medium areas. Signals of average luminance for the three medium areas are outputted as an average luminance value signal A for the area near the focus detecting point, an average luminance value signal B for the area on the outer side adjacent to that area, and an average luminance value signal C for the area on the outermost side.

STEP 37: The grouping into three medium areas upon selection of the left-hand focus detecting point is decided, and the average luminance value signals A, B, C for the respective medium areas are outputted based on the following equations:

$$A = V_{07}$$

$$B = (V_{02} + V_{06} + V_{08} + V_{12})/4$$

$$C = (V_{01} + V_{03} + V_{04} + V_{05} + V_{09} + V_{10} + V_{11} + V_{13} + V_{14} + V_{15})/10$$

Step 38: The grouping into three medium areas upon selection of the central focus detecting point is decided, and the average luminance value signals A, B, C for the respective medium areas are outputted based on the following equation:

$$A = V_{08}$$

$$B = (V_{03} + V_{07} + V_{09} + V_{13})/4$$

$$C = (V_{01} + V_{02} + V_{04} + V_{05} + V_{06} + V_{10} + V_{11} + V_{12} + V_{14} + V_{15})/10$$

STEP 39: The grouping into three medium areas upon selection of the right-hand focus detecting point is decided, and the average luminance value signals A, B, C for the respective medium areas are outputted based on the following equations:

$$A = V_{09}$$

$$B = (V_{04} + V_{08} + V_{10} + V_{14})/4$$

$$C = (V_{01} + V_{02} + V_{03} + V_{05} + V_{06} + V_{07} + V_{11} + V_{12} + V_{13} + V_{15})/10$$

STEP 40: A maximum value Max ($V_{01}$, $V_{02}$, $V_{03}$, .., $V_{15}$) among the luminance value signals outputted from the fifteen small areas is selectively decided and outputted as a maximum luminance value signal MAX.

STEP 41: Return to the main routine.

In the area luminance calculating subroutine, as explained above, the average luminance value signals A, B, C and the the maximum luminance value signal MAX are determined through calculations and outputted.

Figure 8:
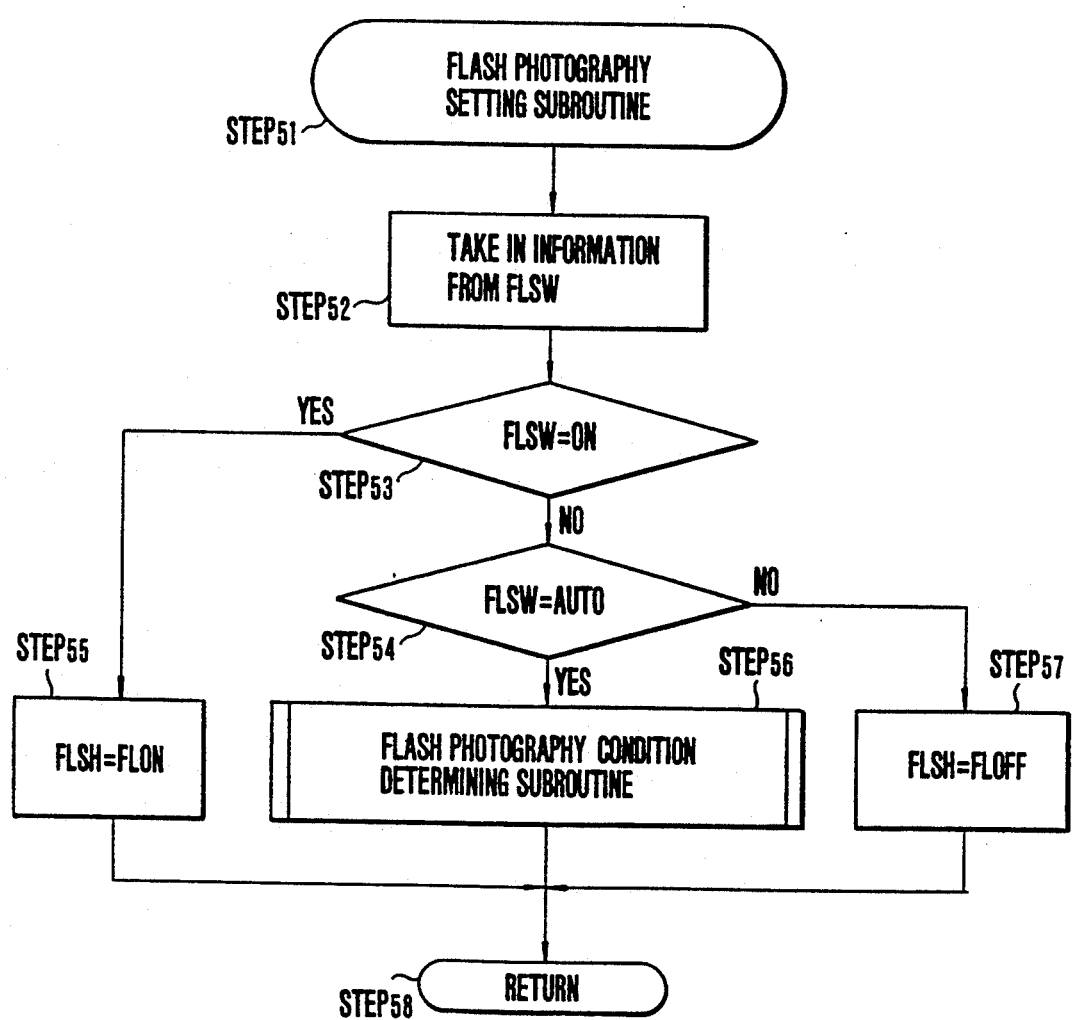

FIG. 8 is a flowchart depicting the flash photography setting subroutine in the STEP 07 of FIG. 5.

STEP 51: Flash photography setting subroutine.

STEP 52: This step takes in information of the flash photography setting from the FLSW 18. The FLSW 18 outputs a flash photography setting signal ON when the photographer sets the mode in which flash photographing is performed forcibly, a flash photography setting signal AUTO when the photographer sets the mode in which the camera automatically judges whether or not to perform flash photographing, and a flash photography setting signal OFF when the photographer sets the mode in which flash photographing is forcibly not performed.

STEP 53: If the flash photography setting signal is ON, the CPU proceeds to a STEP 55. If otherwise, i.e., if the flash photography setting signal is AUTO or OFF, it proceeds to a STEP 54.

STEP 54: If the flash photography setting signal is AUTO, the CPU proceeds to a STEP 56. If otherwise, i.e., if the flash photography setting signal is OFF, it proceeds to a STEP 57.

The STEP 53 and STEP 54 serve to group the input signals from the FLSW 18 into three cases; i.e., ON, AUTO and OFF.

STEP 55: If the input signal from the FLSW 18 is ON, the flash setting signal FLSH is set as FLON and outputted.

STEP 56: This is a flash photography condition determining subroutine which determines whether or not to perform flash photographing depending on luminance distribution of the field of view, if the input signal from the FLSW 18 is AUTO. In this flash photography condition determining subroutine, the area luminance value signal A and the maximum luminance value signal MAX of the luminance value signals outputted from the area luminance calculating subroutine in the STEP 06 of FIG. 5 are entered and subjected to predetermined conditional judgment. If it is determined that flash photographing should be performed, the flash setting signal FLSH is set as FLON and outputted. If it is determined that flash photographing should not be performed, the flash setting signal FLSH is set as FLOFF and outputted.

STEP 57: If the input signal from the FLSW 18 is OFF, the flash setting signal FLSH is set as FLOFF and outputted.

Through the STEP 55 to STEP 57, when flash photographing should be effected, the flash setting signal FLSH is outputted as FLON, and when flash photographing should not be effected the flash setting signal FLSH is outputted as FLOFF.

STEP 58: Return to the main routine.

Figure 9:
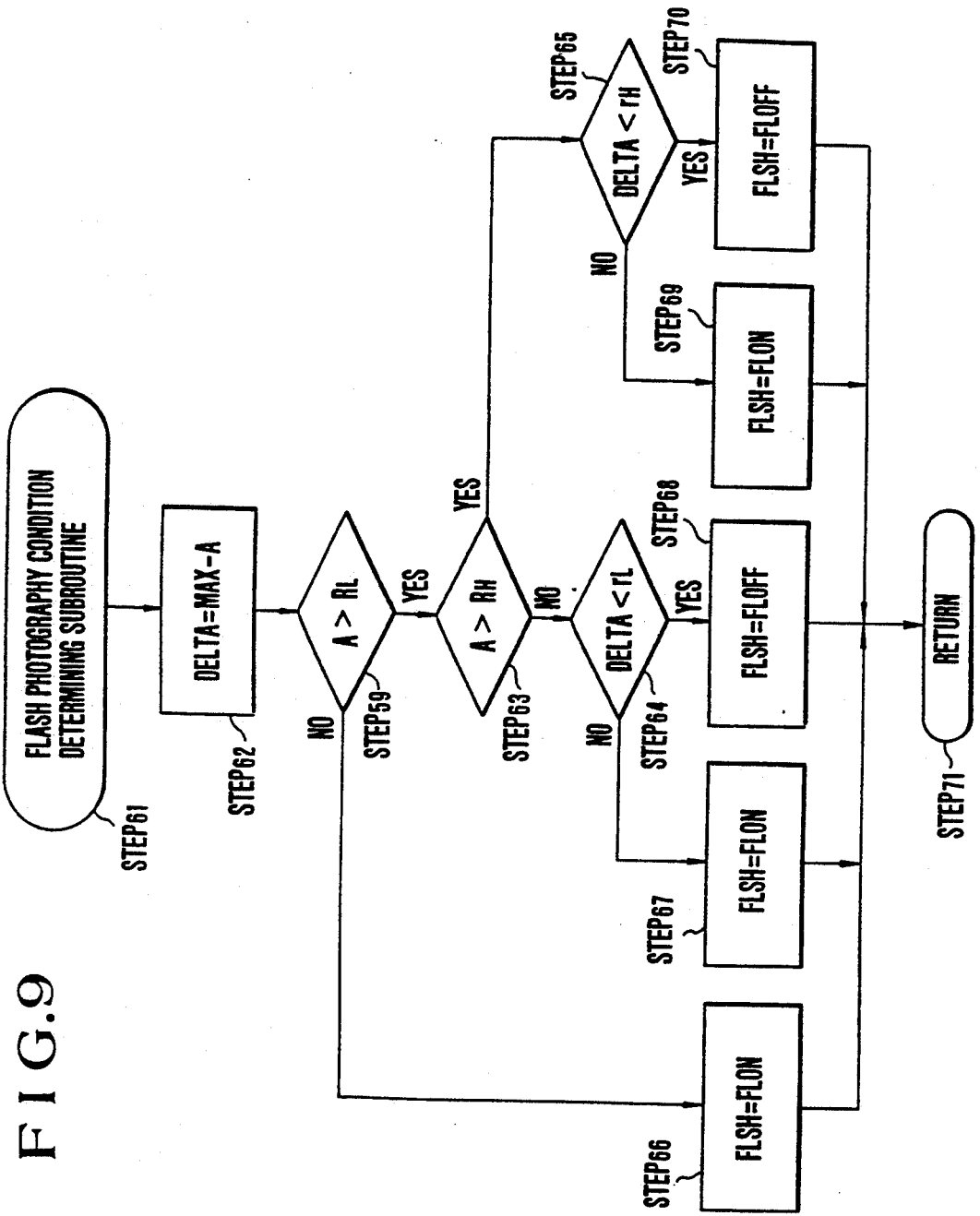

FIG. 9 is a flowchart depicting the flash photography condition determining subroutine in the STEP 56 of FIG. 8.

STEP 61: Flash photography condition determining subroutine.

STEP 62: The area luminance value signal A and the maximum luminance value signal MAX of the output signals outputted from the area luminance calculating subroutine in the STEP 06 of FIG. 5 are entered and a luminance difference signal DELTA therebetween is calculated from the following equation:

$$DELTA = MAX - A$$

STEP 59: The luminance value signal A for the medium area containing the focus detecting point is compared with a predetermined luminance value signal $R_L$ (which value is used here to judge whether the situation is outdoor or indoor) set to represent the low luminance side, thereby recognizing approximate luminance of the main object. If $A > R_L$ holds, i.e., if the situation is determined to be outdoor, the CPU proceeds to a STEP 63. If $A \leq = R_L$ holds, i.e., if the situation is determined to be indoor, it proceeds to a STEP 66.

STEP 63: The luminance value signal A for the medium area containing the focus detecting point is further compared with a predetermined luminance value signal $R_H$ (which value is here on the order fit to judge whether the main object is positioned in daylight or in the shade) set to represent the high luminance side, thereby recognizing approximate luminance of the main object in more detail. If $A > R_H$ holds, i.e., if the situation is determined to be in outdoor daylight, the CPU proceeds to a STEP 65. If $A < R_H$ (hence $R_L < A \leq R_H$) holds, i.e., if the situation is determined to be in the outdoor shade, it proceeds to a STEP 64.

STEP 64: The luminance difference signal DELTA is compared with a first predetermined value $r_L$ used for determining whether or not the main object is in a backlighting condition. If $DELTA < r_L$ holds, the main object is determined to be not in a backlihgting condition and the CPU proceeds to a STEP 68. If $DELTA \geq r_L$, the main object is determined to be in a backlighting condition and it proceeds to a STEP 67.

STEP 65: The luminance difference signal DELTA is compared with a second predetermined value $r_H$ used for determining whether or not the main object is in a backlighting condition. If $DELTA < r_H$ holds, the main object is determined to be not in a backlighting condition and the CPU proceeds to a STEP 70. If $DELTA = \geq r_H$, the main object is determined to be in a backlighting condition and it proceeds to a STEP 69.

Through the STEP 63 to STEP 65, the situation of the field of view, i.e., whether the main object is at low luminance or in a backlighting condition, is judged by grouping the situation into five cases below:

$A \leq R_L$; Low luminance
$R_L < A \leq R_H$
$DELTA \geq r_L$; Slightly high luminance, backlighting
$DELTA < r_L$; Slightly high luminance, frontlighting
$R_H < A$
$DELTA \geq r_H$; High luminance, backlighting
$DELTA < r_H$; High luminance, frontlighting STEP 66: In the case of low luminance, the flash setting signal FLSH is outputted as FLON upon judgment that photographing should be made under flash illumination.

STEP 67: In the case of slightly high luminance and backlighting, the flash setting signal FLSH is outputted as FLON upon judgment that photographing should be made under flash illumination.

STEP 68: In the case of slightly high luminance and frontlighting, the flash setting signal FLSH is outputted as FLOFF upon judgment that photographing should not be made under flash illumination.

STEP 69: In the case of high luminance and backlighting, the flash setting signal FLSH is outputted as FLON upon judgment that photographing should be made under flash illumination.

STEP 70: In the the case of high luminance and frontlighting, the flash setting signal FLSH is outputted as FLOFF upon judgment that photographing should not be made under flash illumination.

Through the STEP 66 to STEP 70, as explained above, whether flash photographing should be made or not is judged depending on the situation of the field of view grouped through the STEP 63 to STEP 65 into five cases, following which the flash setting signal FLSH is decided as FLON or FLOFF and then outputted.

STEP 71: Return to the flash photography setting subroutine.

Figure 12:
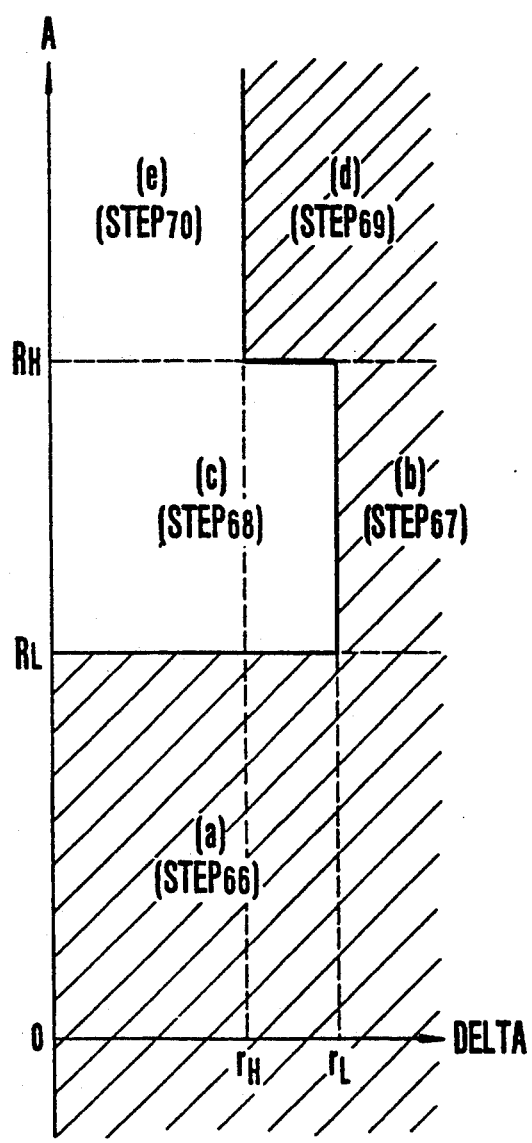

The above-described method of determining the flash photography conditions is illustrated in FIG. 12. In FIG. 12, one axis of the coordinate represents the luminance difference signal DELTA and the other axis of the coordinate represents the area luminance value signal A, for discriminating luminance distribution of the field of view. As described above, this embodiment is arranged to perform photographing under flash illumination in a hatched region of FIG. 12, and under natural light in a non-hatched region. The method of judging the photographing situation based on FIG. 12 will be explained below.

(a) $A \leq R_L$ (STEP 66)

This corresponds to the case that the luminance value signal A for the medium area containing the focus detecting point is smaller than the predetermined value $R_L$ set to represent the low luminance side, and the main object is situated indoors. In such a case, the object is often illuminated by light, such as emitted from a fluorescent lamp or the like, that has a color temperature different from that of outdoor natural light. If the natural light photographing is performed under such illumination light, this would raise the problem of reproducing a photograph with very unnatural light. In this situation, therefore, it is preferable to compensate a color temperature by triggering flash illumination.

(b) $R_L < A \leq R_H$, $r_L \leq DELTA$ (STEP 67)

This corresponds to the case that the luminance value signal A for the medium area containing the focus detecting point is larger than the predetermined value $R_L$ set to represent the low luminance side but smaller than the predetermined value $R_H$ set to represent the high luminance side, and the luminance difference signal DELTA is larger than the predetermined value $r_L$. Such a case is judged as a general backlighting scene such that the main object is situated in the outdoor shade, and the luminance difference between the main object and the background is large. If the natural light photographing is performed under such a backlighting scene, the main object portion would be subjected to a fair extent of underexposure in an attempt to provide correct exposure on a average throughout the image plane, or the background portion would be subjected to a fair extent of overexposure in an attempt to provide correct exposure for the main object portion. Thus, it is difficult to simultaneously provide fairly correct exposure for both the main object portion and the background portion. In this situation, therefore, a photograph is preferably taken with the so-called fill-in flash photography such that the main object portion is illuminated by flash and the background portion, which the flash light cannot reach, is photographed under natural light.

Note that the luminance difference signal DELTA is given by the difference between the maximum value MAX among the luminance value signals for the fifteen small areas and the luminance value signal A for the small area containing the focus detecting point. The maximum luminance value signal MAX serves to extract the luminance of a high-luminance object, such as the sky, cloud or sun, situated in the photographed image plane, whereas the luminance value signal A serves to extract the luminance of a the main object and the vicinity thereof as the area which it represents is changed in conjunction with the selection of the focus detecting point. By utilizing the difference between MAX and A, therefore, whether or not the situation is in a backlighting scene can be determined relatively precisely.

(c) $R_L < A \leq R_H$, DELTA $< r_L$ (STEP 68)

This corresponds to the case that the luminance value signal A for the medium area containing the focus detecting point is larger than the predetermined value $R_L$ set to represent the low luminance side but smaller than the predetermined value $R_H$ set to represent the high luminance side, and the luminance difference signal DELTA is smaller than the predetermined value $r_L$. In such a case, the main object is situated in the outdoor shade, and the high-luminance object such as the sky or cloud is hardly situated in the photographed image plane with relatively small variations in the luminance value signal. Since correct exposure for photographing can be provided under natural light in this situation, it is preferable that flash illumination is not triggered.

(d) $R_H < A$, $r_H \leq$ DELTA (STEP 69)

This corresponds to the case that the luminance value signal A for the medium area containing the focus detecting point is larger than the predetermined value $R_H$ set to represent the high luminance side, and the luminance difference signal DELTA is larger than the predetermined $r_H$ which is slightly smaller than the above predetermined value $r_L$. In such a case, it is supposed that the main object is situated in outdoor daylight and the object of extremely high luminance such as the sun or reflected light thereof is situated in the background, or that the situation is a backlighting scene against the background such as the sky or cloud, i.e., that the main object is somewhat small, and the luminance value signal A for the medium area containing the focus detecting point has already been slightly affected by the background to output a signal of luminance slightly higher than that of the main object. In this case, therefore, a photograph is preferably taken with the so-called fill-in flash photography by triggering flash illumination like the above case (b).

Herein, the predetermined values $r_H$, $r_L$ used for determining whether or not the situation is in a backlighting scene are set to meet the relationship of $r_H < r_L$. Although the sky or cloud of high luminance is generally situated in the background when the situation is judged as a backlighting scene, the luminance of such an object is rarely lower than a predetermined extent of luminance (about Bv 8). Accordingly, it may happen that the luminance difference DELTA becomes large in a backlighting scene where the luminance of the main object is smaller than the predetermined value $R_H$, or that the luminance difference DELTA becomes not so large in a backlighting scene where the luminance of the main object is larger than the predetermined value $R_H$. Also, assuming a backlighting scene where the luminance difference comparable to the luminance of the main object itself is present between the main object and the background, if the main object is somewhat small, the luminance value signal for the medium area containing the focus detecting point is now affected by not only the luminance of the main object, but also the luminance of the background. This results in a tendency that the area luminance value signal A is increased and the luminance difference signal DELTA is decreased. In consideration of the phenomenon as mentioned above, the predetermined values for determining whether or not the situation is in a backlighting scene is set such that the predetermined value $r_H$ representative of the high luminance side and the predetermined value $r_L$ representative of the low luminance side meet the relationship of $r_H < r_L$.

(e) $R_H < A$, DELTA $< r_H$ (STEP 70)

This corresponds to the case that the luminance value signal A for the medium area containing the focus detecting point is larger than the predetermined value $R_H$ set to represent the high luminance side, and the luminance difference signal DELTA is smaller than the predetermined value $r_H$. In such a case, the main object is situated in outdoor daylight, and the photographed image plane has high luminance substantially uniform over all of it. Since correct exposure for photographing can be provided under natural light in this situation, it is preferable, like the case (c), that flash illumination is not triggered.

In this embodiment, as explained above, the situation of the field of view is grouped into the above five cases for determining whether or not flash illumination should be triggered.

Figure 10:
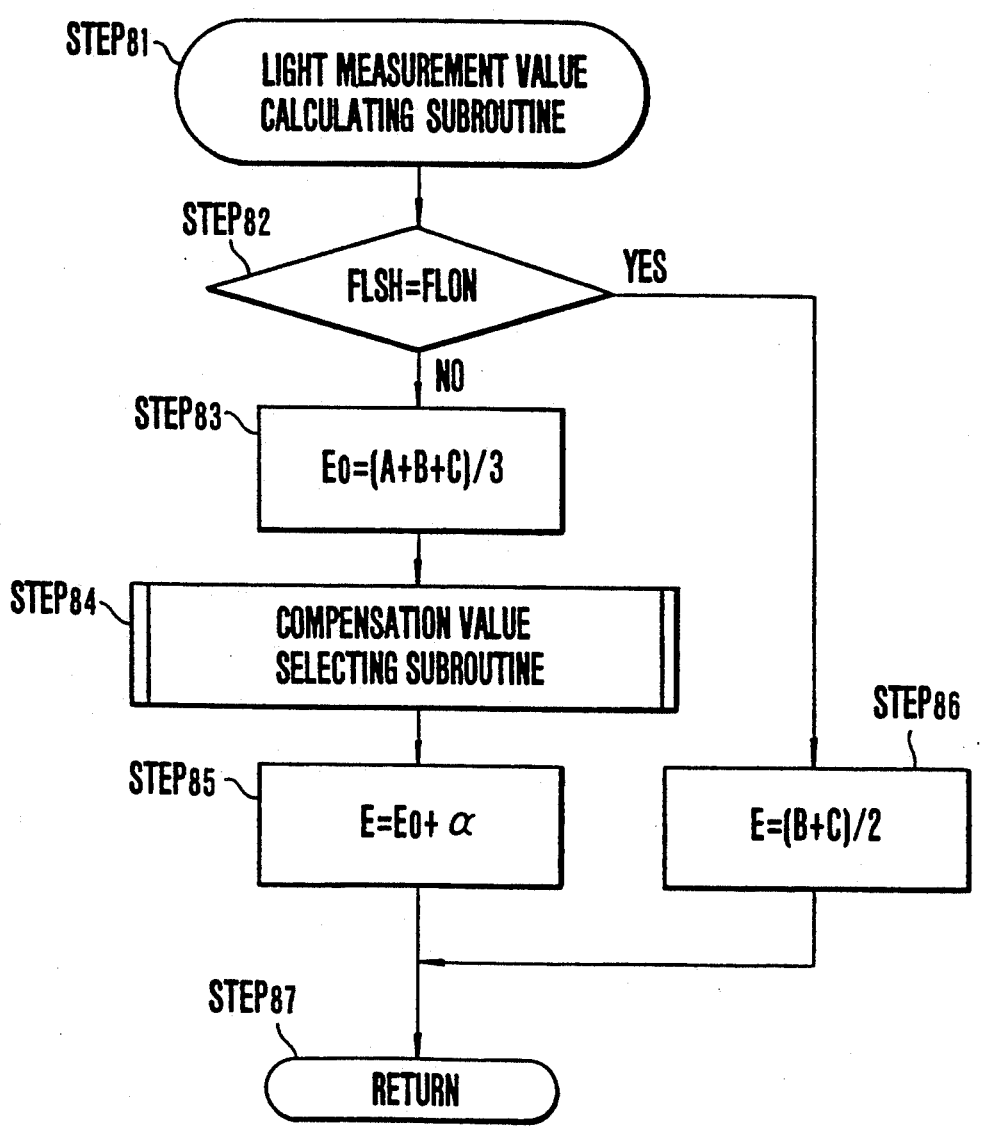

FIG. 10 is a flowchart depicting the light measurement value calculating subroutine in the STEP 08 of FIG. 5.

STEP 81: The light measurement value calculating subroutine.

STEP 82: This step determines whether or not the flash setting signal FLSH is FLON. If FLSH=FLON holds, the CPU proceeds to a STEP 86. In the case of FLSH≠FLON, i.e., if FLSH=FLOFF holds, it proceeds to a STEP 83.

STEP 83: Since the natural light photographing mode is selected, an arithmetic operation for evaluative light measurement is carried out. Using all of the average luminance value signal A for the medium area near the focus detecting point, the average luminance value signal B for the medium area on the outer side adjacent to that medium area, and the average luminance value signal C for the medium area on the outermost side, which have been determined through the STEP 37 to STEP 39, a weighted average luminance value signal Eo for nearly all of the image plane is determined from the following equation by heavily weighting the vicinity of the focus detecting point:

$$Eo = (A + B + C)/3$$

In the above equation, the luminance value signals A, B, C for the three medium areas are simply processed so as to obtain an arithmetical mean value. But, assuming that the medium area near the focus detecting point has an area S(A), the area on the outer side adjacent to that medium area has an area S(B), and the medium area on the outermost side has an area S(C), the area ratio among those three medium areas is expressed by:

$$S(A):S(B):S(C) = 1:4:10$$

As a result of the above calculation, therefore, the weighted average luminance can be derived with the vicinity of the focus detecting point heavily weighted. On this occasion, the weights J(A), J(B), J(C) for the three medium areas A, B, C are reversely proportional to the area ratio and expressed by:

$$J(A):J(B):J(C) = 1:0.25:0.1$$

Note that the above calculation for determining Eo will be referred to as "focus-detecting-point-weighted average light measurement" in the following description.

STEP 84: This is a compensation value selecting subroutine in which by employing the average luminance value signals for the three medium areas determined in the STEP 06 of the area luminance calculating subroutine and the differences between these average luminance value signals, the photographing situation is inferred to selectively decide an exposure compensation value α. Details of this subroutine will be explained later.

STEP 85: This step performs automatic exposure compensation by adding the exposure compensation value α outputted from the compensation value selecting subroutine to the above focus-detecting-point-weighted average light measurement value Eo, so that a light measurement value E is determined from the following equation:

$$E = Eo + \alpha$$

The light measurement value E thus determined through the STEP 83 to STEP 85 is a light measurement in accordance with the evaluative light measurement of this embodiment.

STEP 86: If the flash photography mode is selected in the STEP 82, a light measurement value for flash photographing is calculated in this step. In flash photographing, because the main object portion can have a correct exposure level with adjustment of the light intensity effected by flash illumination, it is desirable that compensation is primarily applied to the background portion for presenting correct exposure. In this embodiment, therefore, the light measurement value is determined from the following equation by employing the area luminance value signals B, C outputted from the area luminance calculating subroutine STEP 06 in order to provide correct exposure for the background portion other than the main object portion:

$$E = (B + C)/2$$

Thus, in this embodiment, the light measurement value for flash photographing is determined by using the luminance value signals for the medium areas outside the that medium area containing the selected focus detecting point.

It is premised exposure is compensated even in the flash photographing at low luminance. In the case of low luminance, however, the STEP 09 in FIG. 5 generally performs the AE calculation in such a manner that the shutter speed will not be so slow to prevent the camera shake. In this case, exposure is determined by a different arithmetic operation and the above equation is not used.

STEP 87: Return to the main routine.

As explained above, the measurement value calculating subroutine enables the calculation of the measurement value to provide correct exposure for the main object and the overall image plane or the background portion in conjunction with the selection of the focus detecting point in either mode of photographing under natural light and flash illumination.

Figure 11:
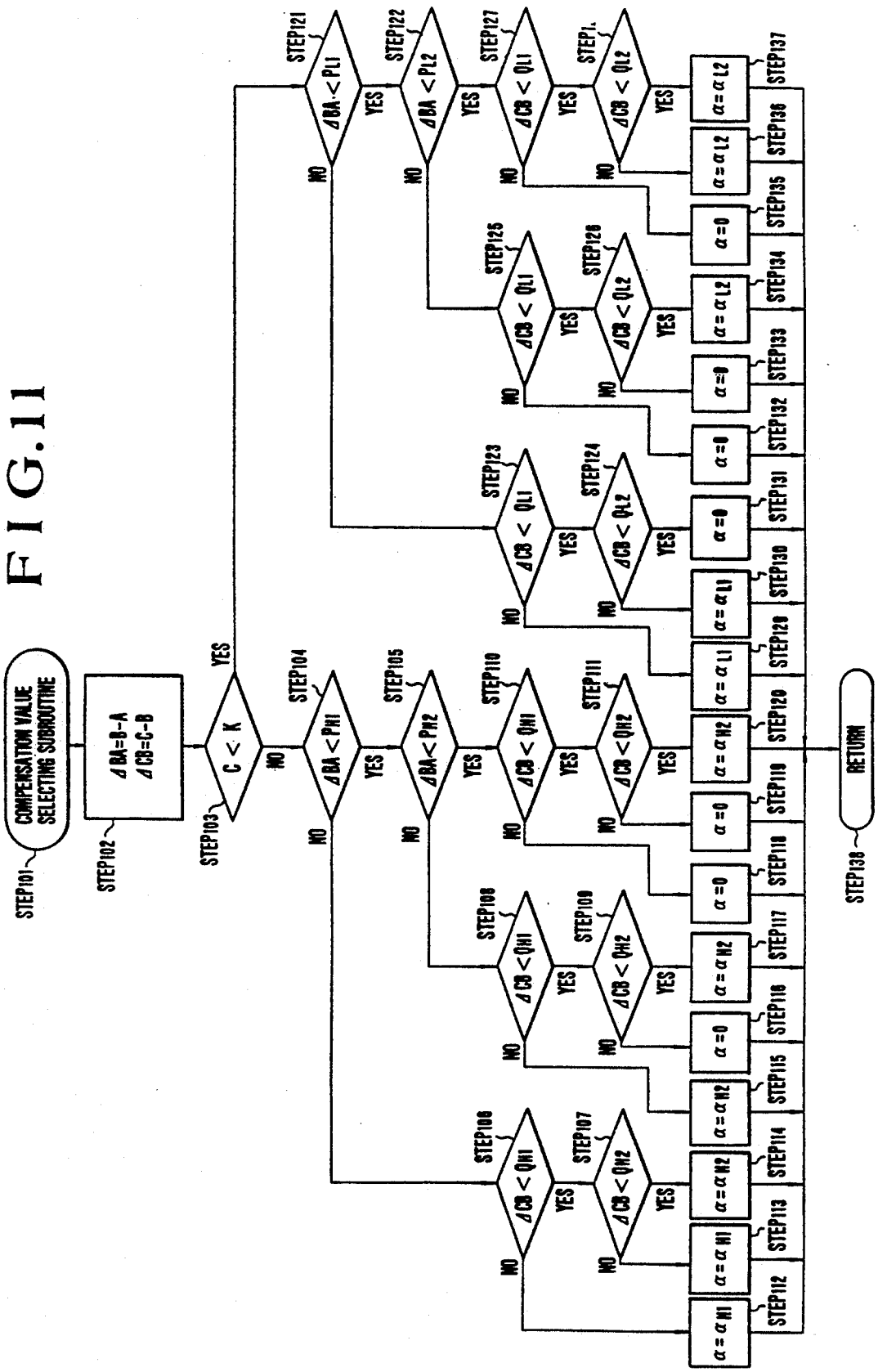

FIG. 11 is a flowchart depicting the compensation value selecting subroutine in the STEP 84 of FIG. 10.

STEP 101: Compensation value selecting subroutine.

STEP 102: Using the average luminance value signal A for the medium area near the focus detecting point, the average luminance value signal B for the medium area on the outer side adjacent to that medium area, and the average luminance value signal C for the medium area on the outermost side, the difference ΔBA between the luminance value signal A and B for the medium areas contiguous to each other, as well as the difference ΔCB between the signals B and C are determined from the following equations:

$$\Delta BA = B - A$$

$$\Delta CB = C - B$$

STEP 103: The average luminance value signal C for the medium area on the outermost side is compared with a signal K (the value of which is on the order enough to discriminate whether the situation is outdoor or indoor) set to represent predetermined luminance, thereby recognizing the approximate brightness of the field of view. The reason of for using the average luminance value signal C for the medium area on the outermost side is because that signal is less affected by the reflectance of the main object and is most suitable to infer the situation of the main object. If $C \geq K$ holds, i.e., if the situation is judged as an outdoor scene, the CPU proceeds to a STEP 104. If $C < K$ holds, i.e., if the situation is determined to be indoor, it proceeds to a STEP 121.

STEP 104: If the average luminance of the medium area on the outermost side is higher than the predetermined value K and the situation is judged as an outdoor scene, the luminance difference ΔBA is first compared with a predetermined value $P_{H1}$ having a positive sign. If $\Delta BA < P_{H1}$ holds, the CPU proceeds to a STEP 105. If $\Delta BA \geq P_{H1}$, it proceeds to a STEP 106.

STEP 105: In the case of $\Delta BA < P_{H1}$, ΔBA is further compared with a predetermined value $P_{H2}$ having a negative sign. If $\Delta BA \geq P_{H2}$ holds, the CPU proceeds to a STEP 110. If $\Delta BA \geq P_{H2}$, i.e., if $P_{H2} \leq \Delta BA < P_{H1}$ holds, it proceeds to a STEP 108.

Through the STEP 104 and STEP 105, the luminance difference ΔBA is classified into three cases below:

$P_{H1} \leq \Delta BA$; ΔBA is a positive value having a large absolute value;

$P_{H2} \leq \Delta BA < P_{H1}$; ΔBA has a small absolute value; and $\Delta BA < P_{H2}$; ΔBA is a negative value having a large absolute value.

STEP 106: In the case of $P_{H1} \leq \Delta BA$, ΔCB is further compared with a predetermined value $Q_{H1}$ having a positive sign. If $\Delta CB < Q_{H1}$ holds, the CPU proceeds to a STEP 107. If $\Delta CB \Delta Q_{H1}$, it proceeds to a STEP 112.

STEP 107: In the case of $\Delta CB < Q_{H1}$, ΔCB is further compared with a predetermined value $Q_{H2}$ having a negative sign. If $\Delta CB < Q_{H2}$ holds, the CPU proceeds to a STEP 114. If $\Delta CB \geq Q_{H2}$, i.e., if $Q_{H2} \leq \Delta CB < Q_{H1}$ holds, it proceeds to a STEP 113.

Through the STEP 106 and STEP 107, the luminance difference ΔCB is classified into three case below:

$Q_{H1} \leq \Delta CB$; $\Delta CB$ is a positive value having a large absolute value;

$Q_{H2} \leq \Delta CB < Q_{H1}$; $\Delta CB$ has a small absolute value; and $\Delta CB < Q_{H2}$; $\Delta CB$ is a negative value having a large absolute value.

STEP 108: In the case of $P_{H2} \leq \Delta BA < P_{H1}$, $\Delta CB$ is further compared with the predetermined value $Q_{H1}$ having a positive sign. If $\Delta CB < Q_{H1}$ holds, the CPU proceeds to a STEP 109. If $\Delta CB \geq Q_{H1}$, it proceeds to a STEP 115.

STEP 109: In the case of $\Delta CB < Q_{H1}$, $\Delta CB$ is further compared with the predetermined value $Q_{H2}$ having a negative sign. If $\Delta CB < Q_{H2}$ holds, the CPU proceeds to a STEP 117. If $\Delta CB \geq Q_{H2}$, i.e., if $Q_{H2} \leq \Delta CB < Q_{H1}$ holds, it proceeds to a STEP 116.

Through the STEP 108 and STEP 109, the luminance difference $\Delta CB$ is classified into the three cases in a like manner to the STEP 106 and STEP 107.

STEP 110: In the case of $\Delta BA < P_{H2}$, $\Delta CB$ is further compared with the predetermined value $Q_{H1}$ having a positive sign. If $\Delta CB < Q_{H1}$ holds, the CPU proceeds to a STEP 111. If $\Delta CB \geq Q_{H1}$, it proceeds to a STEP 118.

STEP 111: In the case of $\Delta CB < Q_{H1}$, $\Delta CB$ is further compared with the predetermined value $Q_{H2}$ having a negative sign. If $\Delta CB < Q_{H2}$ holds, the CPU proceeds to a STEP 120. If $\Delta CB \geq Q_{H2}$, i.e., if $Q_{H2} \leq \Delta CB < Q_{H1}$ holds, it proceeds to a STEP 119.

Through the STEP 110 and STEP 111, the luminance difference $\Delta CB$ is classified into the three cases in a like manner to the STEP 106 and STEP 107.

If the situation is judged as an outdoor scene in the STEP 103, the situation of the field of view is classified into nine cases through the STEP 104 to STEP 111 for selecting the exposure compensation value $\alpha$, as explained above.

STEP 112 to STEP 120: These steps output respective exposure compensation values e fit for the situation of the field of view classified through the STEP 104 to STEP 111. In this embodiment, the value of $\alpha$ comprises only three values; i.e., $\alpha_{H1}$, $\alpha_{H2}$ and 0 (where $\alpha_{H1} < \alpha_{H2} < 0$), and any one of these three values is selected. The method of deciding the exposure compensation value $\alpha$ will be described later.

STEP 121: If the average luminance of the medium area on the outermost side is lower than the predetermined value K and the situation is judged as an indoor scene, the luminance difference $\Delta BA$ is first compared with a predetermined value $P_{L1}$ having a positive sign. If $\Delta BA < P_{L1}$ holds, the proceeds to a STEP 122. If $\Delta BA \geq P_{L1}$, it proceeds to a STEP 123.

STEP 122: In the case of $\Delta BA < P_{L1}$, $\Delta BA$ is further compared with a predetermined value $P_{L2}$ having a negative sign. If $\Delta BA < P_{L2}$ holds, the CPU proceeds to a STEP 127. If $\Delta BA \geq P_{L2}$, i.e., if $P_{L2} \leq \Delta BA < P_{L1}$ holds, it proceeds to a STEP 125.

Through the STEP 121 and STEP 122, the luminance difference $\Delta BA$ is classified into three cases below:

$P_{L1} \leq \Delta BA$; $\Delta BA$ is a positive value having a large absolute value;

$P_{L2} \leq \Delta BA < P_{L1}$; $\Delta BA$ has a small absolute value; and $\Delta BA < P_{L2}$; $\Delta BA$ is a negative value having a large absolute value.

STEP 123: In the case of $P_{L1} \leq \Delta BA$, $\Delta CB$ is further compared with a predetermined value $Q_{L1}$ having a positive sign. If $\Delta CB < Q_{L1}$ holds, the CPU proceeds to a STEP 124. If $\Delta CB \geq Q_{L1}$, it proceeds to a STEP 129.

STEP 124: In the case of $\Delta CB < Q_{L1}$, $\Delta CB$ is further compared with a predetermined value $Q_{L2}$ having a negative sign. If $\Delta CB < Q_{L2}$ holds, the CPU proceeds to a STEP 131. If $\Delta CB \geq Q_{L2}$, i.e., if $Q_{L2} \leq \Delta CB < Q_{L1}$ holds, it proceeds to a STEP 130.

Through the STEP 123 and STEP 124, the luminance difference $\Delta CB$ is classified into three cases below:

$Q_{L1} \leq \Delta CB$; $\Delta CB$ is a positive value having a large absolute value;

$Q_{L2} \leq \Delta CB < Q_{L1}$; $\Delta CB$ has a small absolute value; and $\Delta CB < Q_{L2}$; $\Delta CB$ is a negative value having a large absolute value.

STEP 125: In the case of $P_{L2} \leq \Delta BA < P_{L1}$, $\Delta CB$ is further compared with the predetermined value $Q_{L1}$ having a positive sign. If $\Delta CB < Q_{L1}$ holds, the CPU proceeds to a STEP 126. If $\Delta CB \geq Q^{L_1}$, it proceeds to a STEP 132.

STEP 126: In the case of $\Delta CB < Q_{L1}$, $\Delta CB$ is further compared with the predetermined value $Q_{L2}$ having a negative sign. If $\Delta CB < Q_{L2}$ holds, the CPU proceeds to a STEP 134. If $\Delta CB \geq Q_{L2}$, i.e., if $Q_{L2} \leq \Delta CB < Q_{L1}$ holds, it proceeds to a STEP 133.

Through the STEP 125 and STEP 126, the luminance difference $\Delta CB$ is classified into the three cases in a like manner to the STEP 123 and STEP 124.

STEP 127: In the case of $\Delta BA < P_{L2}$, $\Delta CB$ is further compared with the predetermined value $Q_{L1}$ having a positive sign. If $\Delta CB < Q_{L1}$ holds, the CPU proceeds to a STEP 128. If $\Delta CB \geq Q_{L1}$, it proceeds to a STEP 135.

STEP 128: In the case of $\Delta CB < Q_{L1}$, $\Delta CB$ is further compared with the predetermined value $Q_{L2}$ having a negative sign. If $\Delta CB < Q_{L2}$ holds, the CPU proceeds to a STEP 137. If $\Delta CB \geq Q_{L2}$, i.e., if $Q_{L2} \leq \Delta CB < Q_{L1}$ holds, it proceeds to a STEP 136.

Through the STEP 127 and STEP 128, the luminance difference $\Delta CB$ is classified into the three cases in a like manner to the STEP 123 and STEP 124.

If the situation is judged as an indoor scene in the STEP 103, the situation of the field of view is classified into nine cases through the STEP 121 to STEP 128 for selecting the exposure compensation value $\alpha$, as explained above.

STEP 129 to STEP 137: These steps output respective exposure compensation values $\alpha$ fit for the situation of the field of view classified through the STEP 121 to STEP 128. In this embodiment, the value of $\alpha$ comprises only three values; i.e., $\alpha_{L1}$, $\alpha_{L2}$ and 0 (where $\alpha_{L1} < 0 < \alpha_{L2}$), and any one of these three values is selected. The method of deciding the exposure compensation value $\alpha$ will be described later.

STEP 138: Return to the light measurement value calculating subroutine.

In the compensation value selecting subroutine, as described above, the situation of the field of view is inferred and the correct compensation value $\alpha$ is outputted.

Figure 14A:
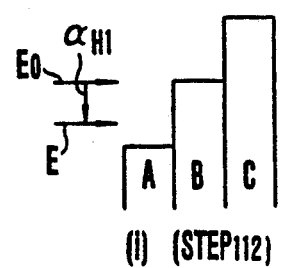
Figure 14A:
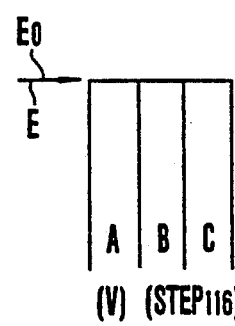

The method of deciding the exposure compensation value $\alpha$ will now be explained. Eighteen cases of conditions classified through the STEP 112 to STEP 120 and the STEP 129 to STEP 137 in FIG. 11 can be depicted in the coordinate plane with the abscissa representing $\Delta BA$ and the ordinate representing $\Delta CB$, respectively, as shown in FIGS. 13(a) and 13(b). Also, the conditions classified through the STEP 112 to STEP 120 and the STEP 129 to STEP 137 in FIG. 11 can be depicted by indicating the respective luminance value signals A, B, C for the three medium areas in the form of a bar graph, as shown in FIGS. 14(a)(i)–(ix) and 14(b) (i)–(ix). In FIGS. 14(a)(i)–(ix) and 14(b) (i) (ix), there are additionally indicated the focus-detecting-point-weighted average light measurement value Eo, the exposure compensation value α and the evaluative light measurement value E corresponding to each of the conditions. By referring to FIGS. 13(a), (i) (i-x) 13(b), (i) (i-x) 14(a) and 14(b), (i) (ix) the method of deciding the exposure compensation value α in the different situations of the field of view depending on the respective conditions will be explained below.

(a) In the case of $K \leqq C$: Outdoor scene (a-i) $P_{H1} < \Delta BA$, $Q_{H1} < \Delta CB$ (STEP 112)

This is the case where $\Delta BA$ is larger than the positive predetermined value $P_{H1}$ and $\Delta CB$ is larger than the positive predetermined value $Q_{H1}$, as shown in FIG. 13(a), and luminance distribution is expressed by FIG. 14(a) (i). Since the background portion is at high luminance and the main subject portion is a relatively low luminance, this case can be generally presumed as at backlighting scene. In addition, since the luminance value signal A, the luminance value signal B and the luminance value signal C are changed stepwise, it is envisaged that the main object situated near the focus detecting point is present over not only the area outputting the luminance value signal A, but also a part of the area outputting the luminance value signal B. In the case of such a luminance distribution, the focus-detecting-point-weighted average light measurement value Eo is outputted as indicated. In order to present correct exposure while taking due consideration of the luminance of the main object and some consideration of the luminance of the background, however, it is preferable to output the evaluative light measurement value E by using the compensation value $\alpha_{H1}$ which has a negative sign and a relatively large absolute value, as shown in FIG. 14(a)(i).

(a-ii) $P_{H1} < \Delta BA$, $Q_{H2} < \Delta CB \leqq Q_{H1}$ (STEP 113)

This is the case where $\Delta BA$ is larger than the positive predetermined value $P_{H1}$ and $\Delta CB$ is larger than the negative predetermined value $Q_{H2}$ but smaller than the positive predetermined value $Q_{H1}$, as shown in FIG. 13(a), and luminance distribution is expressed by FIG. 14(a)(ii). As with the case (i), this case can be also presumed as a backlighting scene. With variations in the luminance value signals taken in mind, it is envisaged that only the luminance value signal A is at relatively low luminance and, therefore, the main object is situated in only the area outputting the luminance value signal A. It is also thought that the main object has a size comparable to the area outputting the luminance value signal A, or slightly smaller than the same area. In the former case, the luminance difference $\Delta BA$ tends to appear relatively large. In the latter case, because the luminance value signal A itself has already been affected by the luminance of the background, the luminance difference $\Delta BA$ tends to become relatively small. In either case, upon detecting that luminance difference $\Delta BA$ is larger than the positive predetermined value $P_{H1}$ and the main object of relatively low luminance is situated near the focus detecting point, for the focus-detecting-point-weighted average light measurement value Eo illustrated, it is preferable to output the evaluative light measurement value E by using the compensation value $\alpha_{H1}$ which is substantially equal to that in the case (i), while taking due consideration of the luminance of the main object and some consideration of the luminance of the background.

(a-iii) $P_{H1} < \Delta BA$, $\Delta CB \leqq Q_{H2}$ (STEP 114)

This is the case where $\Delta BA$ is larger than the positive predetermined value $P_{H1}$ and $\Delta CB$ is smaller than the negative predetermined value $Q_{H2}$, as shown in FIG. 13(a), and luminance distribution is expressed by FIG. 14(a) (iii). Such luminance distribution appears when the object of high luminance is locally present in the area outputting the luminance value signal B. In this case, by so compensating as to eliminate an influence of the locally existing object of high luminance, correct exposure can be provided over all of the image plane. It is, therefore, preferable to output the evaluative light measurement value E by using the compensation value $\alpha_{H2}$ which has a negative sign and a relatively small absolute value, as shown at (iii) in FIG. 14(a).

(a-iv) $P_{H2} < \Delta BA \leqq P_{H1}$, $Q_{H1} < \Delta CB$ (STEP 115)

This is the case where $\Delta BA$ is larger than the negative predetermined value $P_{H2}$ but smaller than the positive predetermined value $P_{H1}$, and $\Delta CB$ is larger than the positive predetermined value $Q_{H1}$, as shown in FIG. 13(a), and luminance distribution is expressed by FIG. 14(a) (iv). Similarly to the case (i), this case can be also presumed as a backlighting scene. With variations in the luminance value signals taken in mind, the luminance value signal A and the luminance value signal B are lower than the luminance value signal C. It is thus envisaged that the main object is situated over a fairly large range including the area outputting the luminance value signal A and the area outputting the luminance value signal B. In the case of such luminance distribution, the light measurement value is preferably outputted by taking much of the area which has been judged as containing the main object. For the focus-detecting-point-weighted average light measurement value Eo, however, because the main object is somewhat affected by the luminance of the background portion of high luminance, it is preferable to output the evaluative light measurement value E by using the compensation value $\alpha_{H2}$ which is substantially equal to that in the case (iii) as shown.

(a-v) $P_{H2} < \Delta BA \leqq P_{H1}$, $Q_{H2} < \Delta CB \leqq Q_{H1}$ (STEP 116)

This is the case where $\Delta BA$ is larger than the negative predetermined value $P_{H2}$ but smaller than the positive predetermined value $P_{H1}$, and $\Delta CB$ is larger than the negative predetermined value $Q_{H2}$ but smaller than the positive predetermined value $Q_{H1}$, as shown in FIG. 13(a), and the luminance difference in small as shown is FIG. 14(a) (v). It is envisaged that such a luminance distribution appears in the case of a backlighting scene which is analogous to that in the case (ii), but in which the size of the main object is so reduced as to raise a difficulty in detecting the luminance of the main object portion, or in the case of a landscape scene or the like which is analogous to that in the case (iv), but in which the size of the main object is so increased as to occupy almost all of the image plane. In this situation, the case of a backlighting scene with a small main object is preferably handled as the case of a backlighting landscape scene. Accordingly, in order to provide correct exposure over all of the image plane, it is preferable to set the compensation value to 0 and output the focus-detecting-point-weighted average light measurement value Eo directly as the evaluative light measurement value E.

(a-vi) $P_{H2} < \Delta BA \leqq P_{H1}$, $\Delta CB \leqq Q_{H2}$ (STEP 117)

This is the case where $\Delta BA$ is larger than the negative predetermined value $P_{H2}$ but smaller than the positive predetermined value $P_{H1}$, and $\Delta CB$ is smaller than the negative predetermined value $Q_{H2}$, as shown in FIG. 13(a), and the luminance distribution is expressed by FIG. 14(a) (vi). Such a luminance distribution appears in the case where the main object of fairly high luminance is situated in both of the area outputting the luminance value signal A and the area outputting the luminance value signal B. Further, in many cases, while the luminance value signal C represents general brightness in the outdoors the main object of fairly high luminance is a (white) object with high reflectance. Accordingly, in order to make the main object portion white to some degree in a photograph, it is preferable in this case to output the evaluative light measurement value E by using the compensation value $\alpha_{H2}$ which is substantially equal to that in the case (iii), as shown.

(a-vii) $\Delta BA \leq P_{H2}$, $Q_{H1} < \Delta CB$ (STEP 118)

This is the case where $\Delta BA$ is smaller than the negative predetermined value $P_{H2}$ and $\Delta CB$ is larger than the positive predetermined value $Q_{H1}$, as shown in FIG. 13(a), and the luminance distribution is expressed by FIG. 14(a) (vii). It is envisaged that such a luminance distribution appears in the case where the main object itself has a fairly high bright-to-dark ratio, or in the case of a landscape scene with some special composition. Either of these cases is not so general and is experienced less frequently. In such a situation, it is preferable to provide correct exposure over all of the image plane and, therefore, to output the focus-detecting-point-weighted average light measurement value Eo directly as the evaluative light measurement value E by setting the compensation value to 0, like the case (v).

(a-viii) $\Delta BA \leq P_{H2}$, $Q_{H2} < \Delta CB \leq Q_{H1}$ (STEP 119)

This is the case where $\Delta BA$ is smaller than the negative predetermined value $P_{H2}$ and $\Delta CB$ is larger than the negative predetermined value $Q_{H2}$ but smaller than the positive predetermined value $Q_{H1}$, as shown in FIG. 13(a), and the luminance distribution is expressed by FIG. 14(a) (viii). Like the case (vi), the main object of this case can be presumed as a (white) object with high reflectance. It is required in a such situation to make the main object portion white to some degree in a photograph. But, since an almost desired exposure can be provided by directly using the focus-detecting-point-weigthed average light measurement value Eo as shown, it is preferable to output the evaluative light measurement value E by setting the compensation value to 0.

(a-ix) $\Delta BA \leq P_{H2}$, $\Delta CB \leq Q_{H2}$ (STEP 120)

This is the case where $\Delta BA$ is smaller than the negative predetermined value $P_{H2}$ and $\Delta CB$ is smaller than the negative predetermined value $Q_{H2}$, as shown in FIG. 13(a), and the luminance distribution is expressed by FIG. 14(a) (ix). The object of this case is presumed to present a scene similar to that in the case (vi). The size of the main object can be estimated to be intermediate between the case (vi) and the case (viii). It can be also estimated in this case that the area near the focus detecting point is at still higher luminance than the cases (vi) and (viii), and an object with high reflectance or some light source is situated in that area. In this situation, the main object portion is made white to some extent in a photograph even by directly using the focus-detecting-point-weighted average light measurement value Eo as shown. In consideration of balance with the peripheral portion of the image plane, however, it is preferable to output the evaluative light measurement value E by using the compensation value $\alpha_{H2}$ which is substantially equal to that in the case (iii), for the purpose of reproducing the main object portion in a further white tone.

(b) In the case of C<K: Indoor scene (b-i) $P_{L1} < \Delta BA$, $Q_{L1} < \Delta CB$ (STEP 129)

This is the case where $\Delta BA$ is larger than the positive predetermined value $P_{L1}$ and $\Delta CB$ is larger than the positive predetermined value $Q_{L1}$, as shown in FIG. 13(b), and the luminance distribution is expressed by FIG. 14(b) (i). Since the background portion is not at so high a luminance and the main subject portion is at a fairly lower luminance than the background portion, this case can be envisaged as such a scene, for example, where the main object is situated in a position out of indoor illumination light. Alternatively, a scene where some (blackish) object with relatively low reflectance is situated near the focus detecting point is also envisaged. In addition, it is thought that the size of the main object is spread over not only the area outputting the luminance value signal A, but also a part of the area outputting the luminance value signal B as with the above case (a-i). Under such conditions, in order to reproduce the situation of the field of view, observed by the photographer, in match with a feeling of the photographer, exposure is desirably set so as to make the main object portion slightly blackish in a photograph to such an extent that details of the main object portion cannot be reproduced. For the focus-detecting-point-weighted average light measurement value Eo, therefore, it is preferable to determine the evaluative light measurement value E, by using the compensation value $\alpha_{L1}$ which has a negative sign and a relatively small absolute value, as shown in FIG. 14(b) (i).

(b-II) $P_{L1} < \Delta BA$, $Q_{L2} < \Delta CB \leq Q_{L1}$ (STEP 130)

This is the case where $\Delta BA$ is larger than the positive predetermined value $P_{L1}$ and $\Delta CB$ is larger than the negative predetermined value $Q_{L2}$ but smaller than the positive predetermined value $Q_{L1}$, as shown in FIG. 13(b), and luminance distribution is expressed by FIG. 14(b) (ii). As with the case (i), this case can be also presumed as a scene where the main object portion is dark. It is also estimated that, like the case (a-ii), the main object has a size slightly smaller than the case (i). In this situation, the main object portion is desirably made somewhat blackish in a photograph similar to the case (i). It is, therefore, preferable to output the evaluative light measurement value E by using the compensation value $\alpha_{L1}$ which is substantially equal to that in the case (i) as shown.

(b-iii) $P_{L1} < \Delta BA$, $\Delta CB \leq Q_{L2}$ (STEP 131)

This is the case where $\Delta BA$ is larger than the positive predetermined value $P_{L1}$ and $\Delta CB$ is smaller than the negative predetermined value $Q_{L2}$, as shown in FIG. 13(b), and the luminance distribution is expressed by FIG. 14(b) (iii). Such a luminance distribution appears when the object of high luminance, such as an illumination lamp, is locally present in the area outputting the luminance value signal B. In this case, in order to provide an exposure fit for such a scene so that the main object portion under an influence of the high-luminance area is made somewhat blackish in a photograph, it is preferable to output the focus-detecting-point-weighted average light measurement value Eo directly as the evaluative light measurement value E by setting the compensation value to 0, as shown.

(b-iv) $P_{L2} < \Delta BA \geq P_{L1}$, $Q_{L1} < \Delta CB$ (STEP 132)

This is the case where $\Delta BA$ is larger than the negative predetermined value $P_{L2}$ but smaller than the positive predetermined value $P_{L1}$, and $\Delta CB$ is larger than the positive predetermined value $Q_{L1}$, as shown in FIG. 13(b), and luminance distribution is expressed by FIG. 14(b) (iv). Similar to the case (i), this case can be also presumed as a scene where the main object portion is dark. It is also estimated that, like the case (a-iv), the main object has the size larger than the case (i) and is situated over a fairly wide range of the photographed image plane. In this situation, the main object portion is also desirably made somewhat blackish in a photograph similar to the case (i). But, since the focus-detecting-point-weighted average light measurement value Eo itself has a value at which fairly correct exposure can be provided, it is preferable to output the focus-detecting-point-weighted average light measurement value Eo directly as the evaluative light measurement value E by setting the compensation value to 0, as shown.

(b-v) $P_{L2} < \Delta BA \leq P_{L1}$, $Q_{L2} < \Delta CB \leq Q_{L1}$ (STEP 133)

This is the case where $\Delta BA$ is larger than the negative predetermined value $P_{L2}$ but smaller than the positive predetermined value $P_{L1}$, and $\Delta CB$ is larger than the negative predetermined value $Q_{L2}$ but smaller than the positive predetermined value $Q_{L1}$, as shown in FIG. 13(b), and the luminance difference is small as shown in FIG. 1(b) (v). Such a luminance distribution appears in the situation similar to the case (a-v). For an indoor scene, particularly, it is found in not a few cases that bright and dark portions are mixed in each area, and the resulting luminance difference is small when the luminance value signals A, B, C for the three medium areas are outputted. In this situation, in order to provide correct exposure over all of the image plane, it is preferable to set the compensation value to 0 and output the focus-detecting-point-weighted average light measurement value Eo directly as the evaluative light measurement value E like the case (a-v).

(b-vi) $P_{L2} < \Delta BA \leq P_{L1}$, $\Delta CB \leq Q_{L2}$ (STEP 134)

This is the case where $\Delta BA$ is larger than the negative predetermined value $P_{L2}$ but smaller than the positive predetermined value $P_{L1}$, and $\Delta CB$ is smaller than the negative predetermined value $Q_{L2}$, as shown in FIG. 13(b), and the luminance distribution is expressed by FIG. 14(b) (vi). Such a luminance distribution appears in the case, for example, where the main object is situated in both of the area outputting the luminance value signal A and the area outputting the luminance value signal B, and the main object is illuminated by illumination light to exhibit relatively higher luminance than the other background portion. In this situation, in order to provide correct exposure by taking much of the luminance value signal for the main object portion while considering the luminance value signal for the background portion to some extent, it is preferable to output the evaluative light measurement value E by using the compensation value $\alpha_{L2}$ which has a positive sign, as shown.

(b-vii) $\Delta BA \leq P_{L2}$, $Q_{L1} < \Delta CB$ (STEP 135)

This is the case where $\Delta BA$ is smaller than the negative predetermined value $P_{L2}$ and $\Delta CB$ is larger than the positive predetermined value $Q_{L1}$, as shown in FIG. 13(b), and the luminance distribution is expressed by FIG. 14(b) (vii). Such a luminance distribution appears in the special situation similar to the case (a-vii). In this case, it is preferable to provide correct exposure over all of the image plane and, therefore, to output the focus-detecting-point-weighted average light measurement value Eo directly as the evalutive light measurement value E by setting the compensation value to 0, like the case (a-vii).

(b-viii) $\Delta BA \leq P_{L2}$, $Q_{L2} < \Delta CB \leq Q_{L1}$ (STEP 136)

This is the case where $\Delta BA$ is smaller than the negative predetermined value $P_{L2}$ and $\Delta CB$ is larger than the negative predetermined value $Q_{L2}$ but smaller than the positive predetermined value $Q_{L1}$, as shown in FIG. 13(b), and the luminance distribution is expressed by FIG. 14(b) (viii). Like the case (vi), this case can be presumed as a scene where only the main object portion is illuminated by illumination light or the like to exhibit relatively high luminance. From the distribution of the luminance value signals, it is also estimated that the main object portion has a size smaller than the case (vi). In this situation, in order to provide correct exposure by taking much of the luminance value signal for the main object portion while considering the luminance value signal for the background portion to some extent, it is preferable to output the evaluative light measurement value E by using the compensation value $\alpha_{L2}$ which is substantially equal to the case (vi), as shown.

(b-ix) $\Delta BA \leq P_{L2}$, $\Delta CB \leq Q_{L2}$ (STEP 137)

This is the case where $\Delta BA$ is smaller than the negative predetermined value $P_{L2}$ and $\Delta CB$ is smaller than the negative predetermined value $Q_{L2}$, as shown in FIG. 13(b), and the luminance distribution is expressed by FIG. 14(b) (ix). The object of the is case is presumed to present a scene similar to that in the case (vi). The size of the main object can be estimated to be intermediate between the case (vi) and the case (viii). It can be also estimated in this case that the area near the focus detecting point is at still a higher luminance than the cases (vi) and (viii), and that the main object illuminated by illumination light or the like is a (somewhat white) object with somewhat higher reflectance, or some illumination lamp is situated behind or near the main object. In this situation, to provide exposure in consideration of balance in the entire image plane, while taking much of the main object portion, such that the area near the focus detecting point is made white to some extent in a photograph, it is preferable to output the evaluative light measurement value E by using the compensation value $\alpha_{L2}$ which is substantially equal to that in the case (vi), as shown.

As described above, this embodiment is arranged to classify the situation of the field of view into eighteen case and selectively decide the optimum exposure compensation value $\alpha$ under the respective conditions. The relationship between the foregoing exposure compensation values in their magnitude is summarized below:

$$\alpha_{H1} < \alpha_{H2} < 0$$

$$\alpha_{L1} < 0 < \alpha_{L2}$$

The relationship between $\alpha_{H1}$ or $\alpha_{H2}$ and $\alpha_{L1}$ in their magnitude is dependent on the setting of the predetermined values $P_{H1}$, $P_{H2}$, $Q_{H1}$, $Q_{H2}$, $P_{L1}$, $P_{L2}$, $Q_{L1}$ and $Q_{L2}$. But, comparing them in the case where the luminance differences $\Delta BA$ and $\Delta CB$ have values substantially equal to each other, it is generally desirable to meet the relationship of $\alpha_{H2} < \alpha_{L1}$.

The method of deciding the exposure compensation value $\alpha$ has been described above as classifying the situation of the field of view into nine cases for each of the luminance differences $\Delta BA$ and $\Delta CB$. However, under the situation that the selected result of the exposure compensation value $\alpha$ is greatly changed depending on the luminance difference as seen in the classified cases (ii) and (v) of FIGS. 14(a) (ii), 14(a) (v), 14(b) (ii) and 14(b) (v), for example, it is particularly desirable to classify the situation in more detail. Also, in those cases of classifying the field of view based on the luminance value signal, the situation is desirably classified in more detail. Classifying the field of view into a larger number of classes permits a reduction in variations in exposure and provide stable exposure when the photographing composition is fluctuated minutely.

Note that a light measuring device of the type inferring the situation of a field of view to output a correct light measuring value by using the luminance differences $\Delta BA$ and $\Delta CB$ as well as the luminance value signal C on the outermost side in the photographed image plane is disclosed in U.S. Pat. No. 4,786,935.

The focus-detecting-point-weighted average light measurement in this embodiment is used to calculate an arithmetical mean value by allocating the weighting factors to the luminance signals for the respective divided small areas depending on the location of the focus detecting point selected. FIGS. 15(a), 15(b) and 15(c) show the weighting factors for the small areas as established when the left-hand focus detecting point is selected, when the central focus detecting point is selected, and when the right-hand focus detecting point is selected, respectively. It is needless to say that combinations of the weighting factors are not limited to the illustrated examples.

In the foregoing embodiment, the flash photography condition is determined in three steps based on the value of the luminance value signal A for the area near the focus detecting point. But, it is a matter of course that more detailed classification is more effective in obtaining closer judgment of the flash photography condition. Although the foregoing embodiment is explained as comparing the luminance difference DELTA with the predetermined value only in the case of high luminance, it can be regarded as comparing the luminance difference DELTA with a predetermined value 0 as well. In this respect, the feature of the foregoing embodiment can be expressed in a different manner in that when deciding the condition of triggering flash illumination, the condition is judged by changing a predetermined value, with which the luminance difference DELTA is to be compared, in three steps of 0, $r_L$ and $r_H$ depending on the luminance A of a predetermined area.

Figure 16A:
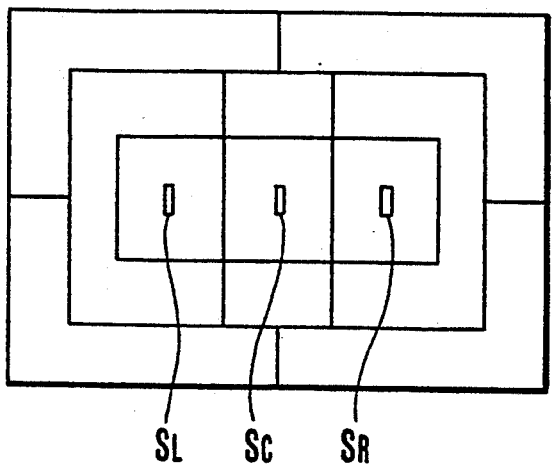
FIGS. 16(a) and 16(b) are illustrations showing different divided patterns of a light receptor for light measurement according to other embodiments of this invention.
Figure 16B:
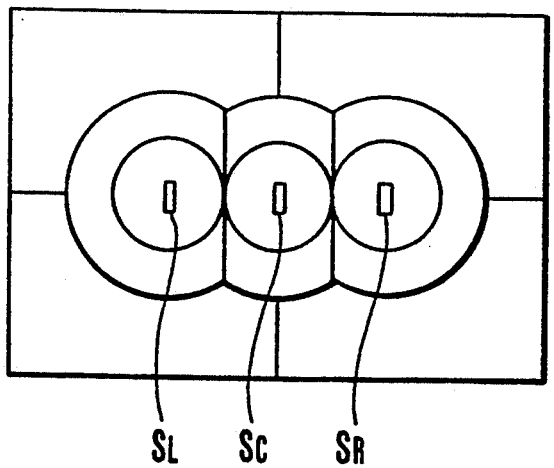

FIGS. 16(a) and 16(b) are illustrations respectively showing different divided patterns of a light receptor for light measurement according to a second embodiment of this invention. While the light receptor for light measurement is divided into the fifteen small areas of the same shape in the above first embodiment of this invention, it may be divided into those small areas which are different in both shape and area, as illustrated in FIGS. 16(a) and 16(b). In these modifications, however, attention must be drawn to the fact that at the time of grouping the luminance value signals for the small areas into ones for plural medium areas, the areas of the respective medium areas will not be changed to a large extent.

In FIGS. 16(a) and 16(b), the field of view is divided into eleven small areas for light measurement purposes. The reduced number of divided areas like this is advantageous in simplifying the light measurement circuit and lowering the cost of the light receiving elements for light measurement. When the light receptor for light measurement is divided as shown in FIGS. 16(a) and 16(b), it is also possible to connect those small areas located in the peripheral portion of the photographed image plane in series, thereby further reducing the effective number of divided areas of the light receptor for light measurement. The technique of reducing the number of divided areas of the light receptor for light measurement in this way is disclosed in U.S. Pat. No. 4,704,024.

As explained above, with the embodiments of this invention, a field of view is divided into plural area and a luminance value signal is outputted for each of the plural areas. By using a maximum value among the luminance value signals outputted and the luminance value signal corresponding to the area including a focus detecting area decided upon selection, the situation of the field of view, particularly, a backlighting condition of a main object, can be detected with relatively high precision. Based on such detection, it is possible to provide a camera which can indicate advice to effect flash illumination on a display device of the camera or automatically activate a flash.

Furthermore, with the foregoing embodiments, by determining the difference between the luminance of the area including the focus detecting area and the above maximum luminance, and comparing the difference with a predetermined value, a backlighting condition can be judged precisely.

In addition, by changing the predetermined value to be compared with the above difference, it is further possible to discriminate between a backlighting condition and a low-luminance condition.

What is claimed is:

1. A camera comprising:
   (a) detection means for dividing a field of view into plural small areas and detecting luminance for each of said plural small areas;
   (b) focus detecting means capable of effecting focus detection for each of plural focus detecting areas in said field of view;
   (c) selection means for selecting at least one of said plural focus detecting areas to be utilized by said focus detecting means; and
   (d) decision means for determining the necessity of flash illumination by using first luminance information detected by said detection means for the small area containing the focus detecting area selected by said selection means and second luminance information for the small area having a maximum luminance among said plural small areas.

2. A camera according to claim 1, wherein said decision means determines the necessity of said flash illumination based on comparison information obtained by comparing said first luminance information and said second luminance information.

3. A camera according to claim 2, wherein said decision means a decision to trigger said flash illumination when said comparison information is larger than a predetermined value.

4. A camera according to claim 1, further comprising light measurement value calculating means for arithmetically processing said luminance for each of said plural small areas obtained by said detection means to determine a light measurement value of said field of view.

5. A camera according to claim 4, wherein said light measurement value calculating means combines said plural small areas to form plural medium areas, and determines said light measurement value of said field of view by using luminance information of said plural medium areas.

6. A camera according to claim 3, further comprising light measurement value calculating means for arithmetically processing said luminance for each of said plural small areas obtained by said detection means to determine a light measurement value of said field of view.

7. A camera according to claim 6, wherein said light measurement value calculating means combines said plural small areas to form plural medium areas, and determines said light measurement value of said field of view by using luminance information of said plural medium areas.

8. A camera according to claim 1, wherein said focus detecting means can effect focus detection for said plural focus detecting areas independently of one another.

9. A camera according to claim 1, wherein said selection means has a manual mode in which a photographer selects one of said plural focus detecting areas, and an automatic mode in which one of said plural focus detecting areas is selected by a predetermined program.

10. A camera according to claim 9, wherein the focus detecting area having the nearest object distance is selected by said program in said automatic mode.

11. A camera comprising:
   (a) detection means for dividing a field of view into plural small areas and detecting luminance for each of said plural small areas;
   (b) focus detecting means capable of effecting focus detection for each of plural focus detecting areas in said field of view;
   (c) selection means for selecting at least one of said plural focus detecting areas to be utilized by said focus detecting means; and
   (d) decision means for determining the necessity of flash illumination based upon a difference between first luminance information detected by said detection means for the small area containing the focus detecting area selected by said selection means and at least one luminance information detected from among said plural small areas.

12. A camera according to claim 11, further comprising light measurement value calculating means for arithmetically processing said luminance for each of said plural small areas obtained by said detection means to determine a light measurement value of said field of view.

13. A camera according to claim 12, wherein said light measurement value calculating means combines said plural small areas to form plural medium areas, and determines said light measurement value of said field of view by using luminance information of said plural medium areas.

14. A camera according to claim 11, wherein said focus detecting means can effect focus detection for said plural focus detecting areas independently of one another.

15. A camera according to claim 11, wherein said selection means has a manual mode in which a photographer selects one of said plural focus detecting areas, and an automatic mode in which one of said plural focus detecting areas is selected by a preset program.

16. A camera according to claim 15, wherein the focus detecting area having the nearest object distance is selected by said program in said automatic mode.

17. A camera according to claim 8, wherein said focus detecting means has plural sets of focus detecting devices, and can determine an in-focus state and a defocus amount of an object for each of said focus detecting areas in each set.

18. A camera according to claim 14, wherein said focus detecting means has plural sets of focus detecting devices, and can determine an in-focus state and a defocus amount of an object for each of said focus detecting areas in each set.

19. A camera comprising:
   (a) detection means for dividing a field of view into at least three small areas and detecting luminance for each of said at least three small areas;
   (b) comparison means for detecting a difference between first luminance information detected by said detection means for a selectable small area in said at least three small areas and second luminance information indicating a maximum luminance value among said at least three small areas; and
   (c) decision means for determining the necessity of flash illumination by comparing the difference information determined by said comparison means with a predetermined value variable depending on said first luminance information.

20. A camera according to claim 19, further comprising focus detecting means for detecting an in-focus state of a focus detecting area in said field of view.

21. A camera according to claim 20, wherein said selectable small area utilized by said comparison means is the small area containing said focus detecting area detected by said focus detecting means.

22. A camera according to claim 20, wherein said focus detecting means can effect focus detection for each of plural focus detecting areas in said field of view.

23. A camera according to claim 19, further comprising light measurement value calculating means for arithmetically processing said luminance for each of said at least three small areas obtained by said detection means to determine a light measurement value of said field of view.

24. A camera according to claim 23, wherein said light measurement value calculating means combines said at least three small areas to form at least three medium areas, and determines said light measurement value of said field of view by using luminance information of said at least three medium areas.

25. A camera comprising:
   (a) detection means for dividing a field of view into plural small areas and detecting luminance for each of said plural areas;
   (b) comparison means for detecting a difference between first luminance information detected by said detection means for a specified small area in said plural small areas and second luminance information indicating a maximum luminance value among said plural small areas;
   (c) decision means for determining the necessity of flash elimination by comparing the difference information determined by said comparison means with a predetermined value variable depending on said first luminance information; and
   (d) focus detecting means for detecting an in-focus state of a focus detecting area in said field of view, wherein said specified small area utilized by said comparison means is the small area containing the focus detecting area selected to be detected by said focus detecting means.

26. A camera according to claim 23, further comprising light measurement value calculating means for arithmetically processing said luminance for each of said plural small areas obtained by said detection means to determine a light measurement value of said field of view.

27. A camera according to claim 26, wherein said light measurement value calculating means combines said plural small areas to form plural medium areas, and determines said light measurement value of said field of view by using luminance information of said plural medium area.

28. A camera comprising:
(a) detecting means for dividing a field of view into at least three small areas and detecting luminance for each of said small areas;
(b) selection means for selecting a specified small area in said at least three small areas,
(c) comparison means for detecting a difference between first luminance information detected by said detection means for said specified small area selected said selecting means and second luminance information indicating a maximum luminance value among said at least three small areas; and
(d) decision means for determining the necessity of flash illumination by comparing the difference information determined by said comparison means with a determined value variable depending on said first luminance information.

29. A camera according to claim 28, further comprising light measurement value calculating means for arithmetically processing said luminance for each of said at least three small areas obtained by said detecting means to determine a light measurement value of said field of view.

30. A camera according to claim 29, wherein said light measurement value calculating means combines said at least three small areas to form plural medium areas, and determines said light measurement value of said field of view by using luminance information of said plural medium areas.

* * * * *

UNITED STATES PATENT AND TRADEMARK OFFICE
CERTIFICATE OF CORRECTION

PATENT NO. : 5,258,803  
DATED : November 2, 1993  
INVENTOR(S) : SHINGO HAYAKAWA Page 1 of 3

It is certified that error appears in the above-indentified patent and that said Letters Patent is hereby corrected as shown below:

On the Title Page and column 1, line 3  
IN THE TITLE at [54]  
    "ELIMANATION" should be --ILLUMINATION--.

IN THE REFERENCES CITED at [56]  
    "4,912,495  3/1900 Ishikawa et al." should be  
    --4,912,965 3/1990 Ishikawa et al.---.

COLUMN 1  
    Line 3, "ELIMANATION" should be --ILLUMINATION--.

COLUMN 3  
    Line 62, "similarly" should be --similar--.

COLUMN 4  
    Line 58, "of" should be deleted.

COLUMN 5  
    Line 37, "an" should be --a--.

COLUMN 9  
    Line 48, "$^V07$" should be --$V_{07}$--; and  
    Line 62, "$^V02$" should be --$V_{02}$--.

COLUMN 11  
    Line 14, "$A \leqq = R_L$" should be --$A \leqq R_L$--;

Line 32, "backlihgting" should be --backlighting--; and  
    Line 42, "$TA = \geqq r_H,$" should be --$TA \geqq r_H,$--.

UNITED STATES PATENT AND TRADEMARK OFFICE
CERTIFICATE OF CORRECTION

PATENT NO. : 5,258,803
DATED : November 2, 1993
INVENTOR(S) : SHINGO HAYAKAWA

It is certified that error appears in the above-indentified patent and that said Letters Patent is hereby corrected as shown below:

COLUMN 14
    Line 11, "is" should be --are--.

COLUMN 15
    Line 58, "premised" should --premised that--.

COLUMN 16
    Line 48, "$\Delta BA \geq P_{H2}$" should be --$\Delta BA < P_{H2}$--; and
    Line 61, $\Delta CB \Delta Q_{H1}$," should be --$\Delta CB \geq Q_{H1}$,--.

COLUMN 17
    Line 37, "values e" should be --values $\alpha$--; and
    Line 49, "the proceeds" should be --the CPU proceeds--.

COLUMN 19
    Line 4, "(i)(i-x)." (both occurrences) should be deleted;
    Line 5, "and 14(b),(i)(ix)" should be --(i)-(ix) and 14(b)(i)-(ix),--; and
    Line 17, "at" should be --a--.

COLUMN 20
    Line 45, "in" should be --is-- and "is" should be --in--.

COLUMN 21
    Line 41, "weigthed" should be --weighted--.

UNITED STATES PATENT AND TRADEMARK OFFICE
CERTIFICATE OF CORRECTION

PATENT NO. : 5,258,803
DATED : November 2, 1993
INVENTOR(S) : SHINGO HAYAKAWA

It is certified that error appears in the above-indentified patent and that said Letters Patent is hereby corrected as shown below:

COLUMN 22
Line 61, "$\Delta BA \geq P_{L1}$," should be --$\Delta BA \leq P_{L1}$,--.

COLUMN 23
Line 12, "$\Delta BA \geq P_{L1}$," should be --$\Delta BA \leq P_{L1}$,--; and
Line 50, value $\alpha_{L2}$" should be --value $\phi_{L2}$--.

COLUMN 24
Line 42, "case" should be --cases--.

COLUMN 26
Line 51, "means a" should be --means makes a--.

COLUMN 29
Line 6, "area." should be --areas.--; and
Line 16, "lected" should be --lected by--.

Signed and Sealed this

Thirteenth Day of September, 1994

Attest:

BRUCE LEHMAN

Attesting Officer   Commissioner of Patents and Trademarks

UNITED STATES PATENT AND TRADEMARK OFFICE
CERTIFICATE OF CORRECTION

PATENT NO. : 5,258,803
DATED : November 2, 1993
INVENTOR(S) : SHINGO HAYAKAWA

It is certified that error appears in the above-indentified patent and that said Letters Patent is hereby corrected as shown below:

COLUMN 11

Line 25, "$A < R_H$" should be --$A \leq R_H$--.

Signed and Sealed this

Seventeenth Day of January, 1995

Attest:

BRUCE LEHMAN

Attesting Officer  Commissioner of Patents and Trademarks